United States Patent
Oyagi et al.

(10) Patent No.: US 9,071,808 B2
(45) Date of Patent: Jun. 30, 2015

(54) STORAGE MEDIUM HAVING STORED INFORMATION PROCESSING PROGRAM THEREIN, INFORMATION PROCESSING APPARATUS, INFORMATION PROCESSING METHOD, AND INFORMATION PROCESSING SYSTEM

(75) Inventors: Yasuyuki Oyagi, Kyoto (JP); Tatsuya Takadera, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 593 days.

(21) Appl. No.: 12/949,298

(22) Filed: Nov. 18, 2010

(65) Prior Publication Data
US 2012/0075501 A1 Mar. 29, 2012

(30) Foreign Application Priority Data
Sep. 28, 2010 (JP) ................................. 2010-217734

(51) Int. Cl.
| G06T 13/00 | (2011.01) |
| H04N 5/77 | (2006.01) |
| A63F 13/40 | (2014.01) |
| H04N 9/82 | (2006.01) |

(52) U.S. Cl.
CPC ............... *H04N 5/772* (2013.01); *A63F 13/10* (2013.01); *A63F 2300/1075* (2013.01); *A63F 2300/204* (2013.01); *H04N 9/8205* (2013.01)

(58) Field of Classification Search
None
See application file for complete search history.

(56) References Cited

U.S. PATENT DOCUMENTS

| 2002/0022521 | A1 | 2/2002 | Idaka | |
| 2004/0250210 | A1* | 12/2004 | Huang et al. | 715/706 |
| 2007/0014439 | A1* | 1/2007 | Ando | 382/118 |
| 2007/0252001 | A1* | 11/2007 | Kail et al. | 235/380 |
| 2008/0294018 | A1* | 11/2008 | Kurtz et al. | 600/301 |
| 2009/0060293 | A1 | 3/2009 | Nagao et al. | |
| 2009/0133051 | A1* | 5/2009 | Hildreth | 725/28 |
| 2010/0110069 | A1* | 5/2010 | Yuan | 345/419 |
| 2011/0159957 | A1 | 6/2011 | Kawaguchi et al. | |

FOREIGN PATENT DOCUMENTS

| JP | 07-160853 | 6/1995 |
| JP | A-2001-321569 | 11/2001 |
| JP | A-2006-212451 | 8/2006 |
| JP | A-2007-226327 | 9/2007 |
| JP | A-2009-211488 | 9/2009 |
| WO | WO 2010 001756 A1 | 1/2010 |

* cited by examiner

*Primary Examiner* — Ke Xiao
*Assistant Examiner* — Raffi Isanians
(74) *Attorney, Agent, or Firm* — Nixon & Vanderhye, P.C.

(57) ABSTRACT

A storage medium having stored an information processing program therein, an information processing apparatus, an information processing method, and an information processing system, which enable highly entertaining display in accordance with a user which performs an operation input, are provided. A characteristic of the face of a user currently using a game apparatus 10 is detected, and data indicating the detected characteristic is compared to already stored data indicating characteristics of the faces of users. If there is data indicating a closest characteristic, among the already stored data, the data is selected. When the data is selected, a motion of an object is set and controlled in accordance with a number of times which the data is selected.

26 Claims, 17 Drawing Sheets

F I G. 3
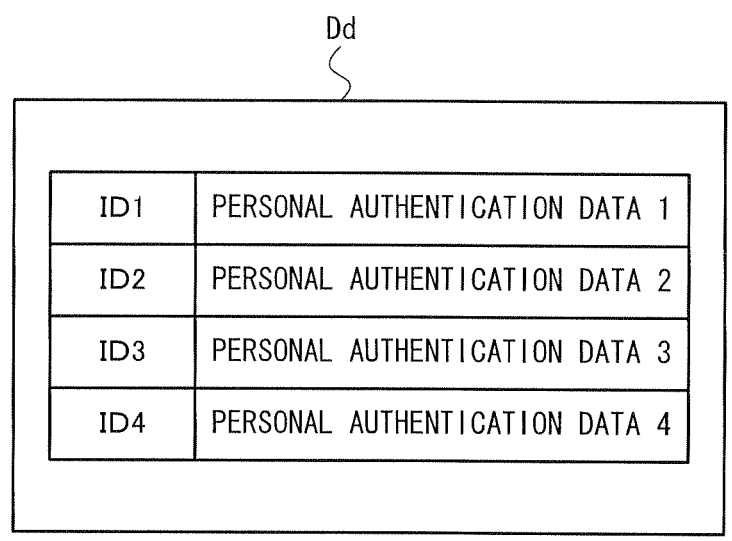

Kg

Df

| ID | ID1 | ID2 | ID3 | ID4 |
|---|---|---|---|---|
| LAST UPDATE DATE AND TIME | 2010/02/02 17:53 | 2010/01/15 13:02 | 2010/02/13 07:23 | 2010/02/07 22:37 |
| PUPPY 1 | 100 | 70 | 65 | 28 |
| PUPPY 2 | 80 | 50 | 45 | 8 |
| KITTEN 1 | 70 | 25 | 36 | 0 |
| PUPPY 3 (PET HOTEL) | 62 | 52 | 30 | 13 |

F I G. 1 1 A
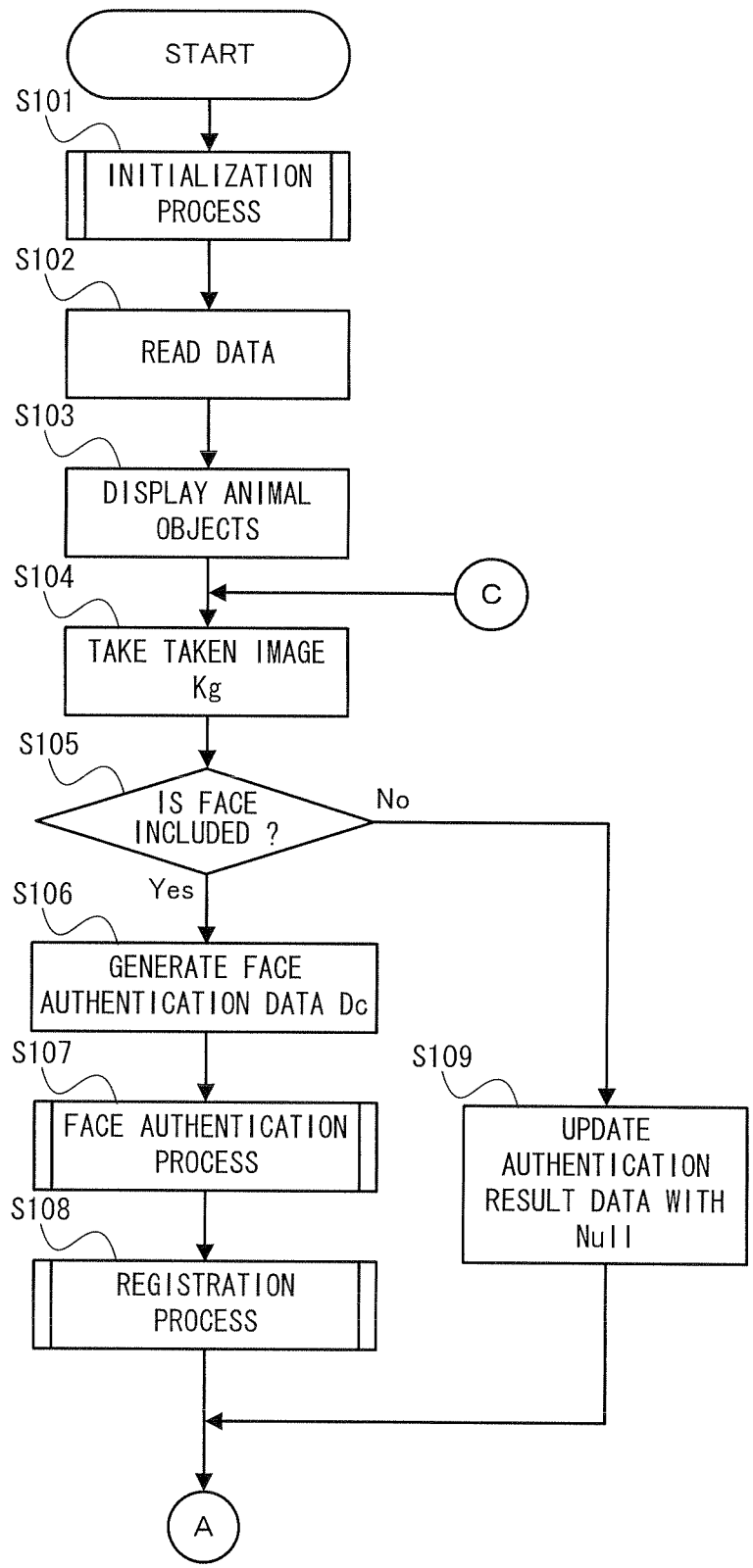

STORAGE MEDIUM HAVING STORED INFORMATION PROCESSING PROGRAM THEREIN, INFORMATION PROCESSING APPARATUS, INFORMATION PROCESSING METHOD, AND INFORMATION PROCESSING SYSTEM

CROSS REFERENCE TO RELATED APPLICATION

The disclosure of Japanese Patent Application No. 2010-217734, filed on Sep. 28, 2010, is incorporated herein by reference.

BACKGROUND OF THE INVENTION

1. Field of the Invention

The present invention relates to a storage medium having stored an information processing program therein, an information processing apparatus, an information processing method, and an information processing system, and, more particularly, to a storage medium having stored an information processing program therein, an information processing apparatus, an information processing method, and an information processing system, which control a motion of an object.

2. Description of the Background Art

Conventionally, an image display device, which is provided in an electronic apparatus such as an electronic notebook and an electronic game apparatus, which displays a creature such as an animal or a plant, and which displays its growth process, is disclosed, for example, in Japanese Laid-Open Patent Publication No. H7-160853. In the image display device disclosed in this publication, an amount of each of elements, such as water, light, and a fertilizer, is selected and given to a plant, and a growth process is displayed in accordance with the given amount of each element.

In the image display device disclosed in the above publication, a displayed growth process of a plant is controlled in accordance with an operation input performed by a user such as selection of an amount of each element. Therefore, whoever the user performing the operation input is, if the operation input is the same, the same control is performed when the growth process of the plant is displayed. In other words, in the publication, the growth process or the like of the plant cannot be controlled and displayed in accordance with the user performing the operation input, and a highly entertaining display cannot be performed in accordance with the user performing the operation input.

SUMMARY OF THE INVENTION

Therefore, an object of the present invention is to provide a storage medium having stored information processing program therein, an information processing apparatus, an information processing method, and an information processing system, which enable highly entertaining display in accordance with a user which performs an operation input.

The present invention has the following features to attain the object mentioned above.

A storage medium having stored information processing program therein, according to the present invention, is a storage medium having stored therein information processing program which is executed by a computer of an information processing apparatus which includes an imaging device and renders one or more objects appearing in a virtual space. The information processing program causes the computer to operate as: face characteristic data storage means; face characteristic detection means; face characteristic data selection means; and motion control means. The face characteristic data storage means stores face characteristic data indicating a characteristic of a face. The face characteristic detection means detects a characteristic of a face included in a taken image which is obtained from the imaging device. When the characteristic of the face is detected by the face characteristic detection means, the face characteristic data selection means selects a piece of the face characteristic data which corresponds to the characteristic of the face detected by the face characteristic detection means, from the face characteristic data storage means. The motion control means controls a motion of each object on the basis of the piece of the face characteristic data selected by the face characteristic data selection means.

According to the above configuration example, a user having a face with a characteristic corresponding to the characteristic of the face which is indicated by the stored face characteristic data is selected as a user currently using the information processing apparatus, and the motion of the object is controlled on the basis of the face characteristic data of the selected user. Thus, the object can be controlled so as to perform a motion corresponding to the user which has performed an operation input by using the information processing apparatus, and highly entertaining display can be performed.

In another configuration example, the information processing program may further cause the computer to operate as: selection times storage means; and selection times update means. Here, the selection times storage means stores, as a number of selection times, a number of times which the face characteristic data stored in the face characteristic data storage means is selected by the face characteristic data selection means, such that the number of times corresponds to each piece of the face characteristic data. The selection times update means updates the number of selection times which is stored in the selection times storage means and corresponds to the piece of the face characteristic data selected by the face characteristic data selection means. The motion control means may perform motion control of the object on the basis of the number of selection times corresponding to the piece of the face characteristic data selected by the face characteristic data selection means.

According to the above configuration example, the motion of the object is controlled in accordance with the number of times which the face characteristic data of the user using the information processing apparatus is selected. Thus, the object can be controlled with a motion corresponding to each of users having different numbers of use times, and more highly entertaining display can be performed.

In still another configuration example, the motion control means: may cause the object to perform a predetermined first motion when the number of selection times corresponding to the piece of the face characteristic data selected by the face characteristic data selection means is equal to or more than a predetermined first threshold; and may cause the object to perform a predetermined second motion different from the first motion, when the number of selection times corresponding to the piece of the face characteristic data selected by the face characteristic data selection means is less than the first threshold.

According to the above configuration example, the object can be controlled so as to perform any one of two motions in accordance with the number of selection times, and highly entertaining display can be performed in accordance with the number of selection times.

In still another configuration example, the motion control means: may cause the object to perform the second motion when the number of selection times corresponding to the piece of the face characteristic data selected by the face characteristic data selection means is equal to or more than a predetermined second threshold which is lower than the first threshold; and may cause the object to perform a predetermined third motion different from the first motion and the second motion, when the number of selection times corresponding to the piece of the face characteristic data selected by the face characteristic data selection means is less than the second threshold.

According to the above configuration example, the object can be controlled so as to perform any one of three motions in accordance with the number of selection times, and highly entertaining display can be performed in accordance with the number of selection times.

In still another configuration example, the information processing program may further cause the computer to operate as face collation means. Here, the face collation means determines whether or not the piece of the face characteristic data which corresponds to the characteristic of the face detected by the face characteristic detection means is stored in the face characteristic data storage means. When a determination result of the face collation means is negative, the motion control means may cause the object to perform the second motion.

According to the above configuration example, the object can be controlled so as to perform, as an initial setting, a predetermined motion to a user which uses, for the first time, the information processing apparatus which executes the information processing program.

In still another configuration example, the motion control means may cause the object to perform the second motion, when the characteristic of the face is not detected by the face characteristic detection means.

According to the above configuration example, even when the characteristic of the face of the user is not detected, the user having the face with the characteristic corresponding to the face characteristic data of the number of selection times corresponding to the second motion is taken as the user, and the motion of the object can be controlled.

In still another configuration example, the information processing program may further cause the computer to operate as identification information storage means. Here, the identification information storage means stores identification information which identifies the piece of the face characteristic data selected by the face characteristic data selection means. The motion control means may control the motion of the object on the basis of the piece of the face characteristic data which is identified by the identification information stored in the identification information storage means.

According to the above configuration example, since the selected face characteristic data of the user is stored, control of the object using the selection result does not need to be performed immediately after the selection of the face characteristic data, but can be performed at any timing. Thus, the processing load on the CPU can be reduced.

In still another configuration example, the information processing program may further cause the computer to operate as detection means. Here, detection means detects at least one of a relative position and a relative orientation of the face, which is included in the taken image obtained from the imaging device, relative to the imaging device. The motion control means may cause the object to perform a motion on the basis of the face characteristic data and the at least one of the relative position and the relative orientation which is detected by the detection means.

According to the above configuration example, the motion of the object can be controlled by using at least one of the relative position and the relative orientation of the face relative to the imaging device, in addition to the selection result of the face characteristic data. Thus, more highly entertaining can be performed.

In still another configuration example, the information processing program may further cause the computer to operate as storage means. Here, the storage means stores at least one of the relative position and the relative orientation which are detected by the detection means. The motion control means may control the motion of the object on the basis of the face characteristic data and the at least one of the relative position and the relative orientation which is stored in the storage means.

According to the above configuration example, since the detection result of at least one of the relative position and the relative orientation is stored, control of the object using the detection result does not need to be performed immediately after the detection of the relative position or the relative orientation, but can be performed at any timing. Thus, the processing load on the CPU can be reduced.

In still another configuration example, the information processing program may further cause the computer to operate as elapsed time calculation means. Here, the elapsed time calculation means calculates an elapsed time from a time when the number of selection times is updated by the selection times update means last time. When a piece of the face characteristic data is selected when the elapsed time is equal to or more than a predetermined time, the selection times update means may update the number of selection times corresponding to the selected piece of the face characteristic data.

According to the above configuration example, the number of selection times is updated each time the face characteristic data of the user is selected, and can be prevented from being excessively high.

In still another configuration example, the selection times storage means may store the number of selection times corresponding to the face characteristic data such that the number of selection times corresponds to each object, the selection times update means may update, for each object, the number of selection times corresponding to the piece of the face characteristic data selected by the face characteristic data selection means, and the motion control means may control the motion of each object on the basis of the number of selection times corresponding to the piece of the face characteristic data selected by the face characteristic data selection means.

According to the above configuration example, the number of selection times can be managed for each object and the motion of each object can be controlled on the basis of the number of selection times corresponding to each object. Thus, more highly entertaining display can be performed.

In still another configuration example, the selection times update means may update the number of selection times corresponding to each object rendered so as to appear in the virtual space, among the numbers of selection times corresponding to the piece of the face characteristic data selected by the face characteristic data selection means.

According to the above configuration example, only the number of selection times corresponding to each object which is visible by the user can be updated. Thus, only the motion of each object seen by the user can be controlled so as to be different from motions of other objects, and diverse displays can be performed.

In still another configuration example, the selection times storage means may further store date and time when the number of selection times is updated, as last update date and time, such that the date and time corresponds to each piece of the face characteristic data. When a piece of the face characteristic data is selected when an elapsed time from the last update date and time is equal to or more than a predetermined time, the selection times update means may update the number of selection times corresponding to the selected piece of the face characteristic data.

According to the above configuration example, the number of selection times is updated when the elapsed time from the time when the number of selection times is updated last time becomes equal to or more than the predetermined time. Thus, the number of selection times can be prevented from being excessively high.

In still another configuration example, the information processing program may further cause the computer to operate as: face collation means; and face characteristic data registration means. Here, the face collation means determines whether or not the piece of the face characteristic data which corresponds to the characteristic of the face detected by the face characteristic detection means is stored in the face characteristic data storage means. When a determination result of the face collation means is negative, the face characteristic data registration means newly stores, in the face characteristic data storage means, the piece of the face characteristic data which corresponds to the characteristic of the face detected by the face characteristic detection means.

According to the above configuration example, even when the face characteristic data corresponding to the characteristic of the face which is closest to the characteristic of the face of the user currently using the information processing apparatus is not selected, the number of selection times can be updated next time, and highly entertaining display can be performed for this user.

In still another configuration example, the information processing program may further cause the computer to operate as face characteristic data deletion means. Here, the face characteristic data deletion means deletes any one piece of the face characteristic data if the number of pieces of the face characteristic data stored in the face characteristic data storage means is a predetermined registerable number when the face characteristic data registration means stores a new piece of the face characteristic data. The face characteristic data registration means may store the new piece of the face characteristic data after the one piece of the face characteristic data is deleted by the face characteristic data deletion means.

According to the above configuration example, even when the registerable number of the face characteristic data is defined, new face characteristic data can be stored.

In still another configuration example, the information processing program may further cause the computer to operate as face characteristic data update means. Here, the face characteristic data update means may update the characteristic of the face detected by the face characteristic detection means with a characteristic of a face which is indicated by the piece of the face characteristic data selected by the face characteristic data selection means.

According to the above configuration example, the already stored face characteristic data can be maintained to be data indicating the latest characteristic of the face of the user.

In still another configuration example, the information processing program may further cause the computer to operate as similarity degree calculation means. Here, the similarity degree calculation means calculates a similarity degree between the characteristic of the face detected by the face characteristic detection means and the characteristic of the face which is indicated by the piece of the face characteristic data selected by the face characteristic data selection means. when the similarity degree is equal to or more than a predetermined similarity degree threshold, the face characteristic data update means updates the characteristic of the face which is indicated by the piece of the face characteristic data selected by the face characteristic data selection means.

According to the above configuration example, the already stored face characteristic data can be maintained with higher accuracy.

In still another configuration example, the information processing program may be executed by the computer of the information processing apparatus which is held by a user and in which the imaging device is located at a position where the imaging device is capable of taking an image of a face of the user from a front of the user when the user looks straight at a display screen on which each object is rendered.

According to the above configuration example, the face of the user looking at an object which is displayed on the display screen by the information processing program being executed can be taken from the front of the user. Thus, while highly entertaining display using the object is performed, a taken image can be taken and a characteristic of the face of the user can be detected.

Further, the present invention may be implemented in the form of an information processing apparatus or information processing system including the above respective means, or in the form of an information processing method including operations performed by the above respective means.

According to the present invention, highly entertaining display can be performed in accordance with the user which has performed an operation input.

These and other objects, features, aspects and advantages of the present invention will become more apparent from the following detailed description of the present invention when taken in conjunction with the accompanying drawings.

BRIEF DESCRIPTION OF THE DRAWINGS

FIG. 3 is a diagram illustrating an example of data stored in a main memory 32 in accordance with the information processing program being executed;

FIG. 11A is a flowchart showing an example of information processing performed by the game apparatus 10 in FIG. 10 executing the information processing program;

DESCRIPTION OF THE PREFERRED EMBODIMENTS (First Embodiment)

Figure 1:
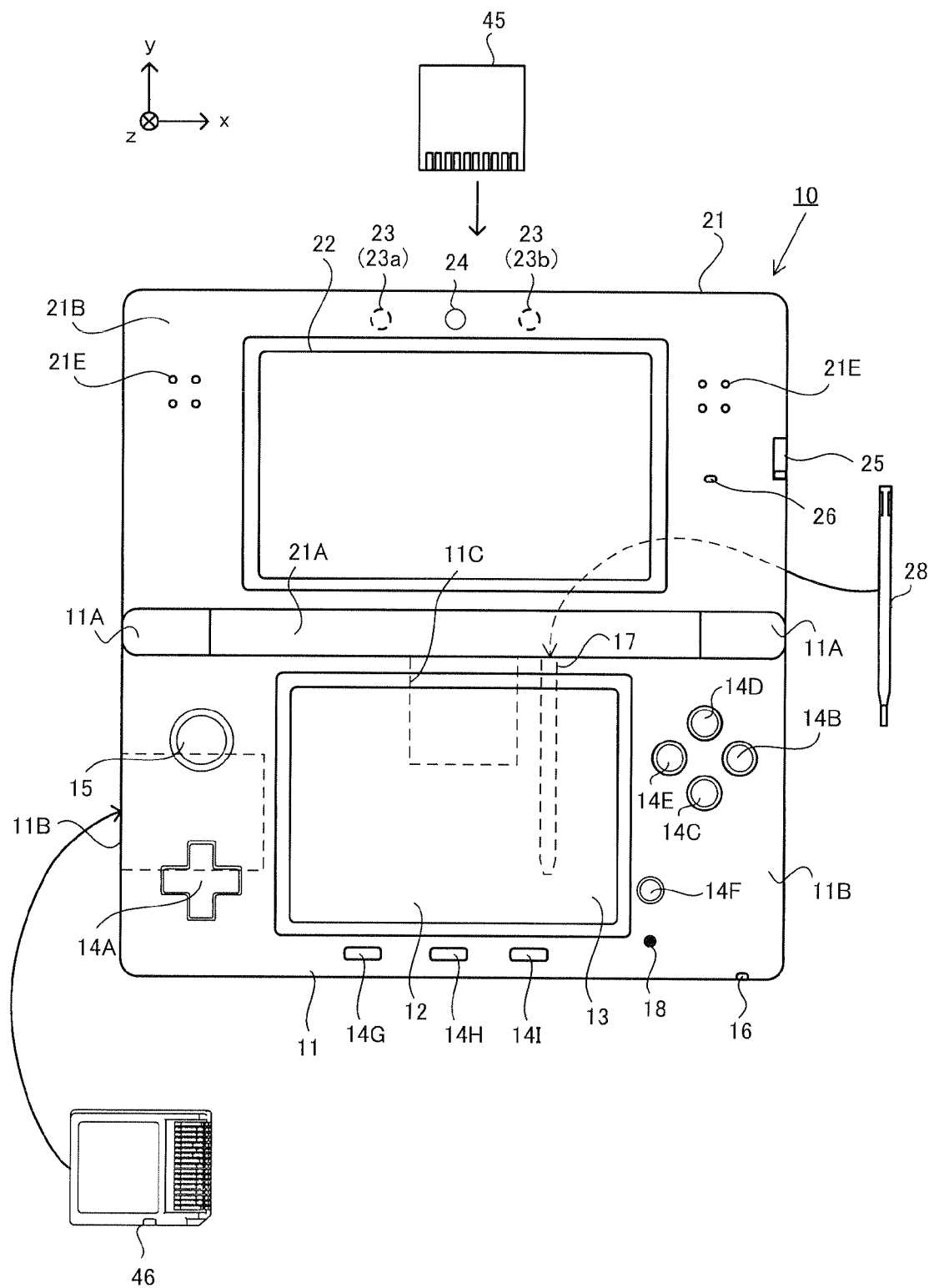
FIG. 1 is an external view of a game apparatus 10 which executes an information processing program according to an embodiment of the present invention.

With reference to the drawings, an image processing apparatus executing an image processing program according to a first embodiment of the present invention will be described. The image processing program of the present invention is usable by being executed in any computer system. Hereinafter, a hand-held game apparatus 10 will be described as an example of the image processing apparatus, and an image processing program executed in the game apparatus 10 will be described as an example of the image processing program of the present invention. FIG. 1 is a plan view illustrating an example of an appearance of the game apparatus 10. The game apparatus 10 is configured to be foldable as shown in FIG. 1. FIG. 1 is a front view of an example of the game apparatus 10 in an opened state. The game apparatus 10 includes an imaging section, and is able to take an image by means of the imaging section, display the taken image on a screen, and store data of the taken image. The game apparatus 10 can execute a game program which is stored in an exchangeable memory card or a game program which is received from a server or another game apparatus, and also can display, on the screen, an image generated by computer graphics processing, such as an image taken by a virtual camera set in a virtual space, for example.

The game apparatus 10 includes a lower housing 11 and an upper housing 21 as shown in FIG. 1. The lower housing 11 and the upper housing 21 are connected to each other so as to be openable and closable (foldable). In the example of FIG. 1, the lower housing 11 and the upper housing 21 are each formed in a horizontally long plate-like rectangular shape, and are connected to each other at long side portions thereof so as to be pivotable with respect to each other. Usually, a user uses the game apparatus 10 in the opened state. When not using the game apparatus 10, the user keeps the game apparatus 10 in a closed state. In addition to the closed state and the opened state, the game apparatus 10 is capable of maintaining any angle between the lower housing 11 and the upper housing 21, which angle ranges between the closed state and the opened state, by frictional force generated at a connection portion, and the like. In other words, the upper housing 21 can be caused to remain stationary at any angle with respect to the lower housing 11.

In the lower housing 11, a lower LCD (Liquid Crystal Display) 12, a touch panel 13, operation buttons 14A to 14I, an analog stick 15, an LED 16, an insertion opening 17, and a microphone hole 18 are provided. The following will describe these components.

As shown in FIG. 1, the lower LCD 12 is accommodated in the lower housing 11. The lower LCD 12 has a horizontally long shape, and is located such that a long side direction thereof corresponds to a long side direction of the lower housing 11. The lower LCD 12 is positioned at the center of the lower housing 11. The lower LCD 12 is provided on the inner side surface (main surface) of the lower housing 11, and a screen of the lower LCD 12 is exposed at an opening provided in the inner side surface of the lower housing 11. When the game apparatus 10 is not used, the game apparatus 10 is in the closed state, thereby preventing the screen of the lower LCD 12 from becoming unclean and damaged. The number of pixels of the lower LCD 12 is, for example, 320 dots×240 dots (the longitudinal line×the vertical line). The lower LCD 12 is a display device for displaying an image in a planar manner (not in a stereoscopically visible manner), which is different from the upper LCD 22 as described below. Although an LCD is used as a display device in the present embodiment, any other display device such as a display device using EL (Electro Luminescence), or the like may be used. In addition, a display device having any resolution may be used as the lower LCD 12.

As shown in FIG. 1, the game apparatus 10 includes the touch panel 13 as an input device. The touch panel 13 is mounted so as to cover the screen of the lower LCD 12. In the present embodiment, for example, a resistive film type touch panel is used as the touch panel 13. However, the touch panel 13 is not limited thereto, and any press-type touch panel such as electrostatic capacitance type may be used In the present embodiment, the touch panel 13 has the same resolution (detection accuracy) as that of the lower LCD 12. However, the resolution of the touch panel 13 and the resolution of the lower LCD 12 may not necessarily be the same. Further, the insertion opening 17 (indicated by a broken line in FIG. 1) is provided on the upper side surface of the lower housing 11. The insertion opening 17 is used for accommodating a touch pen 28 which is used for performing an operation on the touch panel 13. Although an input on the touch panel 13 is usually made by using the touch pen 28, a finger of a user may be used for making an input on the touch panel 13, in addition to the touch pen 28.

The operation buttons 14A to 14L are each an input device for making a predetermined input. As shown in FIG. 1, among operation buttons 14A to 14I, a cross button 14A (a direction input button 14A), a button 14B, a button 14C, a button 14D, a button 14E, a power button 14F, a selection button 14G, a HOME button 14H, and a start button 14I are provided on the inner side surface (main surface) of the lower housing 11. The cross button 14A is cross-shaped, and includes buttons for indicating an upward, a downward, a leftward, or a rightward direction. The button 14B, button 14C, button 14D, and button 14E are positioned so as to form a cross shape.

Although not shown, an L button, an R button, and a volume button are provided in the game apparatus 10. The L button and the R button are provided on the upper side surface of the lower housing 11. The L button is positioned on the left end portion of the upper side surface of the lower housing 11, and the R button is positioned on the right end portion of the upper side surface of the lower housing 11. For example, at least one of the L button or the R button can be caused to act as a shutter button (an imaging instruction button) of the imaging section. When one of the L button or the R button is caused to act as the shutter button, it is possible to assign any other function to the other button. Further, the volume button is provided on the left side surface of the lower housing 11. The volume button is used for adjusting a sound volume of a speaker of the game apparatus 10.

The button 14A to 14E, the selection button 14G, the HOME button 14H, the start button 14I, the L button, and the R button are assigned functions, respectively, in accordance with a program executed by the game apparatus 10, as necessary. For example, the cross button 14A is used for selection operation and the like, and the operation buttons 14B to 14E are used for, for example, determination operation and cancellation operation. The power button 14F is used for powering the game apparatus 10 on/off.

The analog stick 15 is a device for indicating a direction, and is provided to the left of the lower LCD 12 in an upper portion of the inner side surface of the lower housing 11. As shown in FIG. 1, the cross button 14A is provided to the left of the lower LCD 12 in the lower portion of the lower housing 11. That is, the analog stick 15 is provided above the cross button 14A. The analog stick 15 and the cross button 14A are positioned so as to be operated by a thumb of a left hand with which the lower housing is held. Further, the analog stick 15 is provided in the upper area, and thus the analog stick 15 is positioned such that a thumb of a left hand with which the lower housing 11 is held is naturally positioned on the position of the analog stick 15, and the cross button 14A is positioned such that the thumb of the left hand is positioned on the position of the cross button 14A when the thumb of the left hand is slightly moved downward from the analog stick 15. The analog stick 15 has a top, corresponding to a key, which slides parallel to the inner side surface of the lower housing 11. The analog stick 15 acts in accordance with a program executed by the game apparatus 10. For example, when a game in which a predetermined object appears in a three-dimensional virtual space is executed by the game apparatus 10, the analog stick 15 acts as an input device for moving the predetermined object in the three-dimensional virtual space. In this case, the predetermined object is moved in a direction in which the top corresponding to the key of the analog stick 15 slides. As the analog stick 15, a component which enables an analog input by being tilted by a predetermined amount, in any direction, such as the upward, the downward, the rightward, the leftward, or the diagonal direction, may be used.

Further, the microphone hole 18 is provided on the inner side surface of the lower housing 11. Under the microphone hole 18, a microphone (see FIG. 2) is provided as a sound input device described below, and the microphone detects for a sound from the outside of the game apparatus 10.

As shown in FIG. 1, an insertion opening 11B is provided in the left side surface of the lower housing 11 such that an external data storage memory 46 is allowed to be inserted therein. A cover is provided on the insertion opening 11B so as to be openable and closable. Inside the cover, a connector (not shown) is provided for electrically connecting between the game apparatus 10 and an external data storage memory 46. The external data storage memory 46 is detachably connected to the connector. The external data storage memory 46 is used for, for example, recording (storing) data of an image taken by the game apparatus 10. The connector and the cover may be provided on the right side surface of the lower housing 11.

As shown in FIG. 1, an insertion opening 11C through which an external memory 45 having stored a game program therein is inserted is provided on the upper side surface of the lower housing 11. A connector (not shown) for electrically connecting between the game apparatus 10 and the external memory 45 in a detachable manner is provided inside the insertion opening 11C. A predetermined game program is executed by connecting the external memory 45 to the game apparatus 10. The connector and the insertion opening 11C may be provided on another side surface (for example, the right side surface) of the lower housing 11.

As shown in FIG. 1, the LED 16 for notifying a user of an ON/OFF state of a power supply of the game apparatus 10 is provided on the lower side surface of the lower housing 11. In addition, although not shown, an LED for notifying a user of an establishment state of a wireless communication of the game apparatus 10 is provided on the right side surface of the lower housing 11. The game apparatus 10 can perform wireless communication with other devices. The LED provided on the right side surface of the lower housing 11 is lit up when a wireless communication with another device is established. The game apparatus 10 has a function of connecting to a wireless LAN in a method conforming to, for example, IEEE802.11.b/g standard. A wireless switch for enabling/disabling the function of the wireless communication is also provided on the right side surface of the lower housing 11 (not shown).

A rechargeable battery (not shown) acting as a power supply for the game apparatus 10 is accommodated in the lower housing 11, and the battery can be charged through a terminal provided on a side surface (for example, the upper side surface) of the lower housing 11.

In the upper housing 21, an upper LCD 22, two imaging sections (an outer left imaging section 23a and an outer right imaging section 23b), an inner imaging section 24, a 3D adjustment switch 25, and a 3D indicator 26 are provided. The following will describe theses components in detail.

As shown in FIG. 1, the upper LCD 22 is accommodated in the upper housing 21. The upper LCD 22 has a horizontally long shape, and is located such that a long side direction thereof corresponds to a long side direction of the upper housing 21. The upper LCD 22 is positioned at the center of the upper housing 21. The area of a screen of the upper LCD 22 is set so as to be greater than the area of the screen of the lower LCD 12, for example. Further, the screen of the upper LCD 22 is horizontally elongated as compared to the screen of the lower LCD 12. Specifically, a rate of the horizontal width in the aspect ratio of the screen of the upper LCD 22 is set so as to be greater than a rate of the horizontal width in the aspect ratio of the screen of the lower LCD 12.

Figure 2:
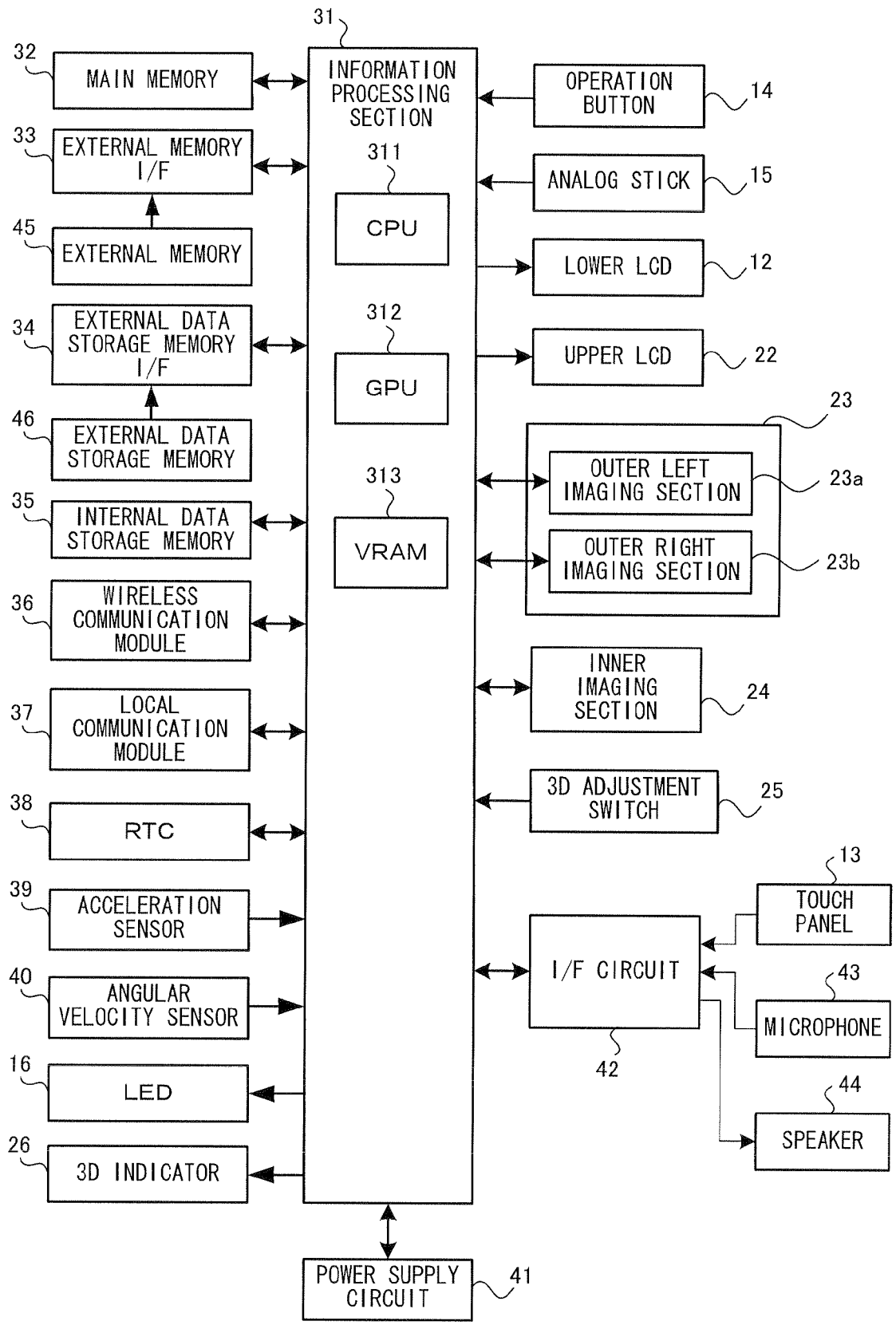
FIG. 2 is a block diagram illustrating an example of an internal configuration of the game apparatus 10 in FIG. 1.
Figure 4:
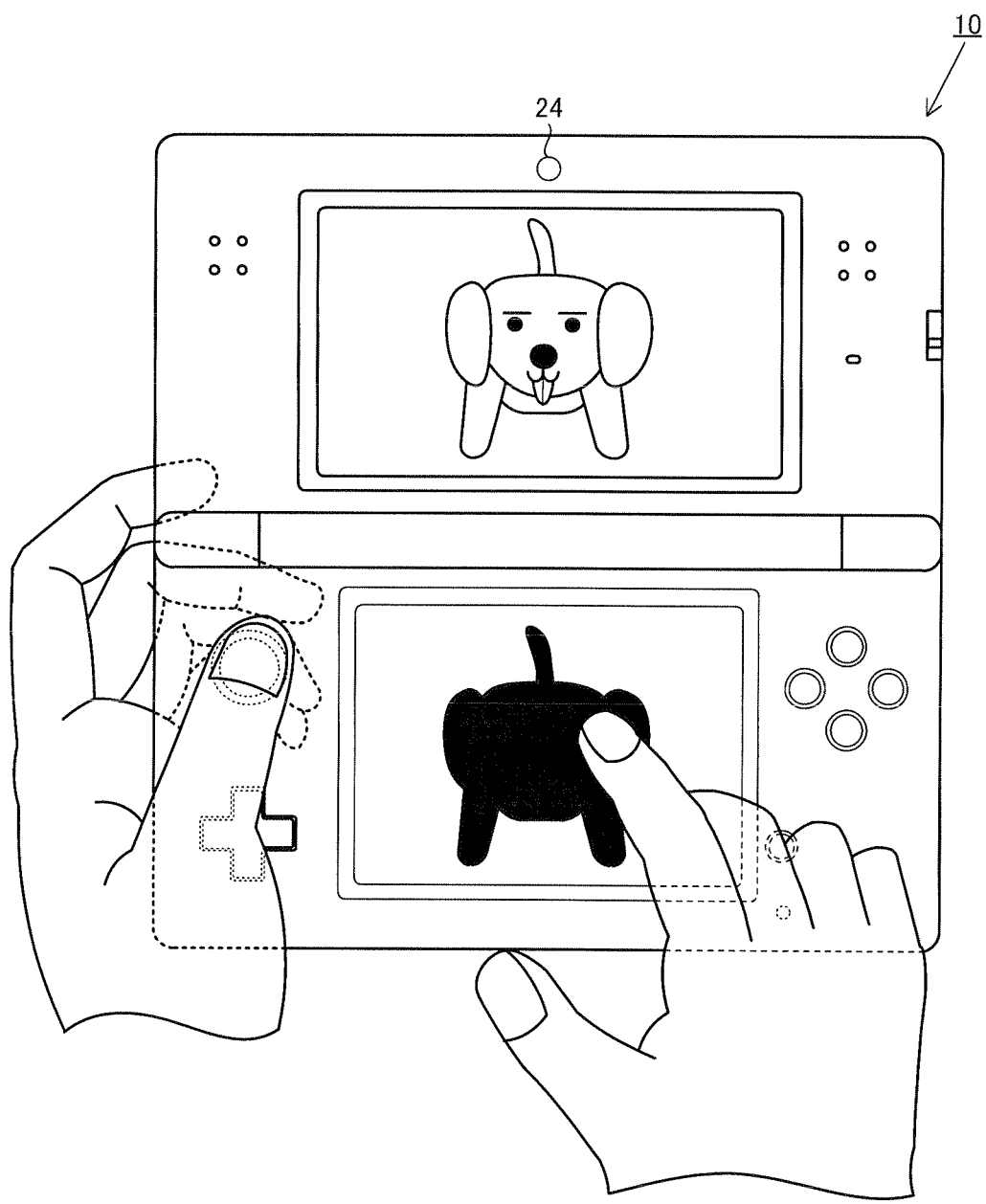
FIG. 4 is a diagram illustrating a state in which a user holds the game apparatus 10 with one hand.

The screen of the upper LCD 22 is provided on the inner side surface (main surface) 21B of the upper housing 21, and the screen of the upper LCD 22 is exposed at an opening provided in the inner side surface of the upper housing 21. Further, as shown in FIG. 2 and FIG. 4, the inner side surface of the upper housing 21 is covered with a transparent screen cover 27. The screen cover 27 protects the screen of the upper LCD 22, and integrates the upper LCD 22 and the inner side surface of the upper housing 21 with each other, thereby achieving unity. The number of pixels of the upper LCD 22 may be, for example, 800 dots×240 dots (the horizontal line× the vertical line). Although, in the present embodiment, the upper LCD 22 is an LCD, a display device using EL, or the like may be used. In addition, a display device having any resolution may be used as the upper LCD 22.

The upper LCD 22 is a display device capable of displaying a stereoscopically visible image. The upper LCD 22 is capable of displaying an image for a left eye and an image for a right eye by using substantially the same display area. Specifically, the upper LCD 22 is a display device using a method in which the image for a left eye and the image for a right eye are alternately displayed in the horizontal direction in predetermined units (for example, every other line). Alternatively, the upper LCD 22 may be a display device using a method in which the image for a left eye and the image for a right eye are alternately displayed for a predetermined time period. Further, the upper LCD 22 is a display device capable of displaying an image which is stereoscopically visible with naked eyes. In this case, as the upper LCD 22, a lenticular lens type display device or a parallax barrier type display device is used which enables the image for a left eye and the image for a right eye, which are alternately displayed in the horizontal direction, to be separately viewed by the left eye and the right eye, respectively. In the present embodiment, the upper LCD 22 is of a parallax barrier type. The upper LCD 22 displays, by using the image for a right eye and the image for a left eye, an image (a stereoscopic image) which is stereoscopically visible with naked eyes. That is, the upper LCD 22 allows a user to view the image for a left eye with her/his left eye, and the image for a right eye with her/his right eye by utilizing a parallax barrier, so that a stereoscopic image (a stereoscopically visible image) exerting a stereoscopic effect for a user can be displayed. Further, the upper LCD 22 may disable the parallax barrier. When the parallax barrier is disabled, an image can be displayed in a planar manner (it is possible to display a planar visible image which is different from a stereoscopically visible image as described above. Specifically, a display mode is used in which the same displayed image is viewed with a left eye and a right eye.). Thus, the upper LCD 22 is a display device capable of switching between a stereoscopic display mode for displaying a stereoscopically visible image and a planar display mode (for displaying a planar visible image) for displaying an image in a planar manner. The switching of the display mode is performed by the 3D adjustment switch 25 described below.

An outer imaging section 23 is constituted of the two imaging sections (the outer left imaging section 23a and the outer right imaging section 23b) provided on an outer side surface 21D of the upper housing 21 (the back surface opposite to the main surface of the upper housing 21 on which the upper LCD 22 is provided). The imaging directions of the outer left imaging section 23a and the outer right imaging section 23b agree with the outward normal direction of the outer side surface 21D, and are parallel to each other. Each of the outer left imaging section 23a and the outer right imaging section 23b includes an imaging device, such as a CCD image sensor or a CMOS image sensor, having a common predetermined resolution, and a lens. The lens may have a zooming mechanism.

The outer left imaging section 23a and the outer right imaging section 23b are positioned at positions which are reverse of positions above the upper edge of the screen of the upper LCD 22 and which are on the upper portion of the upper housing 21 in an opened state. Specifically, when the upper LCD 22 is projected on the outer side surface of the upper housing 21, the outer left imaging section 23a and the outer right imaging section 23b are positioned on the outer side surface of the upper housing 21 and at a position above the upper edge of the screen of the upper LCD 22 having been projected on the outer side surface of the upper housing 21. Thus, the outer imaging section 23 and the upper LCD 22 do not interfere with each other inside the upper housing 21. Therefore, the upper housing 21 may have a reduced thickness as compared to a case where the outer imaging section 23 is positioned on a position reverse of the position of the screen of the upper LCD 22.

Note that the outer left imaging section 23a and the outer right imaging section 23b can be used as a stereo camera depending on a program executed by the game apparatus 10. Further, depending on a program, when any one of the two outer imaging sections (the outer left imaging section 23a and the outer right imaging section 23b) is used alone, the outer imaging section 23 may be used as a non-stereo camera. Further, depending on a program, images taken by the two outer imaging sections (the outer left imaging section 23a and the outer right imaging section 23b) may be combined with each other or may compensate for each other, thereby enabling imaging using an extended imaging range.

The inner imaging section 24 is positioned on the inner side surface (main surface) 21B of the upper housing 21, and acts as an imaging section which has an imaging direction which is the same direction as the inward normal direction of the inner side surface. The inner imaging section 24 includes an imaging device, such as a CCD image sensor and a CMOS image sensor, having a predetermined resolution, and a lens. The lens may have a zooming mechanism.

As shown in FIG. 1, when the upper housing 21 is in the opened state, the inner imaging section 24 is positioned, on the upper portion of the upper housing 21, above the upper edge of the screen of the upper LCD 22. Further, in this state, the inner imaging section 24 is positioned at the horizontal center of the upper housing 21 (on a line which separates the upper housing 21 (the screen of the upper LCD 22) into two equal parts, that is, the left part and the right part). Specifically, as shown in FIG. 1, the inner imaging section 24 is positioned on the inner side surface of the upper housing 21 at a position reverse of the middle position between the outer left imaging section 23a and the outer right imaging section 23b. Specifically, when the outer left imaging section 23a and the outer right imaging section 23b provided on the outer side surface of the upper housing 21 are projected on the inner side surface of the upper housing 21, the inner imaging section 24 is positioned at the middle position between the outer left imaging section 23a and the outer right imaging section 23b having been projected. Thus, when a user views the upper LCD 22 from the front thereof, the inner imaging section 24 can take an image of a face of the user from the front thereof. Further, the outer left imaging section 23a and the outer right imaging section 23b do not interfere with the inner imaging section 24 inside the upper housing 21, thereby enabling reduction of the thickness of the upper housing 21.

The 3D adjustment switch 25 is a slide switch, and is used for switching a display mode of the upper LCD 22 as described above. Further, the 3D adjustment switch 25 is used for adjusting the stereoscopic effect of a stereoscopically visible image (stereoscopic image) which is displayed on the upper LCD 22. As shown in FIG. 1, the 3D adjustment switch 25 is provided at the end portions of the inner side surface and the right side surface of the upper housing 21, and is positioned at a position at which the 3D adjustment switch 25 is visible to a user when the user views the upper LCD 22 from the front thereof. The 3D adjustment switch 25 has a slider which is slidable to any position in a predetermined direction (along the longitudinal direction of the right side surface), and a display mode of the upper LCD 22 is determined in accordance with the position of the slider.

For example, when the slider of the 3D adjustment switch 25 is positioned at the lowermost position, the upper LCD 22 is set to the planar display mode, and a planar image is displayed on the screen of the upper LCD 22. Note that the upper LCD 22 may remain set to the stereoscopic display mode, and the same image may be used for the image for a left eye and the image for a right eye, to perform planar display. On the other hand, when the slider is positioned above the lowermost position, the upper LCD 22 is set to the stereoscopic display mode. In this case, a stereoscopically visible image is displayed on the screen of the upper LCD 22. When the slider is positioned above the lowermost position, a manner in which the stereoscopic image is visible is adjusted in accordance with the position of the slider. Specifically, an amount of deviation in the horizontal direction between a position of an image for a right eye and a position of an image for a left eye is adjusted in accordance with the position of the slider.

The 3D indicator 26 indicates whether or not the upper LCD 22 is in the stereoscopic display mode. For example, the 3D indicator 26 is implemented by an LED, and is lit up when the stereoscopic display mode of the upper LCD 22 is enabled. As shown in FIG. 1, the 3D indicator 26 is positioned near the screen of the upper LCD 22 on the inner side surface of the upper housing 21. Therefore, when a user views the screen of the upper LCD 22 from the front thereof, the user can easily view the 3D indicator 26. Therefore, also when a user is viewing the screen of the upper LCD 22, the user can easily recognize the display mode of the upper LCD 22.

Further, a speaker hole 21E is provided on the inner side surface of the upper housing 21. A sound is outputted through the speaker hole 21E from a speaker 44 described below.

Next, an internal configuration of the game apparatus 10 will be described with reference to FIG. 2. FIG. 2 is a block diagram illustrating an example of the internal configuration of the game apparatus 10.

As shown in FIG. 2, the game apparatus 10 includes, in addition to the components described above, electronic components such as an information processing section 31, a main memory 32, an external memory interface (external memory I/F) 33, an external data storage memory I/F 34, an internal data storage memory 35, a wireless communication module 36, a local communication module 37, a real-time clock (RTC) 38, an acceleration sensor 39, an angular velocity sensor 40, a power supply circuit 41, an interface circuit (I/F circuit) 42, and the like. These electronic components are mounted on an electronic circuit substrate, and accommodated in the lower housing 11 (or the upper housing 21).

The information processing section 31 is information processing means which includes a CPU (Central Processing Unit) 311 for executing a predetermined program, a GPU (Graphics Processing Unit) 312 for performing image processing, and the like. In the present embodiment, a predetermined program is stored in a memory (for example, the external memory 45 connected to the external memory I/F 33 or the internal data storage memory 35) inside the game apparatus 10. The CPU 311 of the information processing section 31 executes a process described below by executing the predetermined program. The program executed by the CPU 311 of the information processing section 31 may be acquired from another device through communication with the other device. The information processing section 31 further includes a VRAM (Video RAM) 313. The GPU 312 of the information processing section 31 generates an image in accordance with an instruction from the CPU 311 of the information processing section 31, and renders the image in the VRAM 313. The GPU 312 of the information processing section 31 outputs the image rendered in the VRAM 313, to the upper LCD 22 and/or the lower LCD 12, and the image is displayed on the upper LCD 22 and/or the lower LCD 12. In this manner, the CPU 311 can display an image on the upper LCD 22 and/or the lower LCD 12 by giving an instruction to the GPU 312 and causing the VRAM 313 to render the image.

To the information processing section 31, the main memory 32, the external memory I/F 33, the external data storage memory I/F 34, and the internal data storage memory 35 are connected. The external memory I/F 33 is an interface for detachably connecting to the external memory 45. The external data storage memory I/F 34 is an interface for detachably connecting to the external data storage memory 46.

The main memory 32 is volatile storage means used as a work area and a buffer area for the information processing section 31 (the CPU 311). That is, the main memory 32 temporarily stores various types of data used for image processing or game processing, and temporarily stores a program acquired from the outside (the external memory 45, another device, or the like), for example. In the present embodiment, for example, a PSRAM (Pseudo-SRAM) is used as the main memory 32.

The external memory 45 is non-volatile storage means for storing a program executed by the information processing section 31. The external memory 45 is implemented as, for example, a read-only semiconductor memory. When the external memory 45 is connected to the external memory I/F 33, the information processing section 31 can load a program stored in the external memory 45. A predetermined process is performed by the program loaded by the information processing section 31 being executed. The external data storage memory 46 is implemented as a non-volatile readable and writable memory (for example, a NAND flash memory), and is used for storing predetermined data. For example, images taken by the outer imaging section 23 and/or images taken by another device are stored in the external data storage memory 46. When the external data storage memory 46 is connected to the external data storage memory I/F 34, the information processing section 31 loads an image stored in the external data storage memory 46, and the image can be displayed on the upper LCD 22 and/or the lower LCD 12.

The internal data storage memory 35 is implemented as a non-volatile readable and writable memory (for example, a NAND flash memory), and is used for storing predetermined data. For example, data and/or programs downloaded through the wireless communication module 36 by wireless communication is stored in the internal data storage memory 35.

The wireless communication module 36 has a function of connecting to a wireless LAN by using a method conforming to, for example, IEEE 802.11.b/g standard. The local communication module 37 has a function of performing wireless communication with the same type of game apparatus in a predetermined communication method (for example, infrared communication). The wireless communication module 36 and the local communication module 37 are connected to the information processing section 31. The information processing section 31 can perform data transmission to and data reception from another device via the Internet by using the wireless communication module 36, and can perform data transmission to and data reception from the same type of another game apparatus by using the local communication module 37.

The acceleration sensor 39 is connected to the information processing section 31. The acceleration sensor 39 detects magnitudes of accelerations (linear accelerations) in the directions of the straight lines along the three axial directions (xyz axial directions in the present embodiment), respectively. The acceleration sensor 39 is provided, for example, inside the lower housing 11. In the acceleration sensor 39, as shown in FIG. 1, the long side direction of the lower housing 11 is defined as x axial direction, the short side direction of the lower housing 11 is defined as y axial direction, and the direction orthogonal to the inner side surface (main surface) of the lower housing 11 is defined as z axial direction, thereby detecting the magnitude of the linear acceleration in each axial direction of the game apparatus 10. The acceleration sensor 39 is, for example, an electrostatic capacitance type acceleration sensor. However, another type of acceleration sensor may be used. The acceleration sensor 39 may be an acceleration sensor for detecting a magnitude of an acceleration for one axial direction or two-axial directions. The information processing section 31 can receive data (acceleration data) representing accelerations detected by the acceleration sensor 39, and calculate an orientation and a motion of the game apparatus 10.

The angular velocity sensor 40 is connected to the information processing section 31. The angular velocity sensor 40 detects angular velocities about three axes (X-axis, Y-axis, Z-axis in the present embodiment) of the game apparatus 10, and outputs data (angular velocity data) indicative of the detected angular velocities, to the information processing section 31. The angular velocity sensor 40 is provided, for example, inside the lower housing 11. The information processing section 31 receives the angular velocity data outputted from the angular velocity sensor 40, and calculates an orientation and a motion of the game apparatus 10.

The RTC 38 and the power supply circuit 41 are connected to the information processing section 31. The RTC 38 counts time, and outputs the time to the information processing section 31. The information processing section 31 calculates a current time (date) based on the time counted by the RTC 38. The power supply circuit 41 controls power from the power supply (the rechargeable battery accommodated in the lower housing 11 as described above) of the game apparatus 10, and supplies power to each component of the game apparatus 10.

The I/F circuit 42 is connected to the information processing section 31. The microphone 43, the speaker 44, and the touch panel 13 are connected to the I/F circuit 42. Specifically, the speaker 44 is connected to the I/F circuit 42 through an amplifier which is not shown. The microphone 43 detects a voice from a user, and outputs a sound signal to the I/F circuit 42. The amplifier amplifies a sound signal outputted from the I/F circuit 42, and a sound is outputted from the speaker 44. The I/F circuit 42 includes a sound control circuit for controlling the microphone 43 and the speaker 44 (amplifier), and a touch panel control circuit for controlling the touch panel 13. The sound control circuit performs A/D conversion and D/A conversion on the sound signal, and converts the sound signal to a predetermined form of sound data, for example. The touch panel control circuit generates a predetermined form of touch position data based on a signal outputted from the touch panel 13, and outputs the touch position data to the information processing section 31. The touch position data represents a coordinate of a position (touch position), on an input surface of the touch panel 13, on which an input is made. The touch panel control circuit reads a signal outputted from the touch panel 13, and generates the touch position data every predetermined time. The information processing section 31 acquires the touch position data, to recognize a touch position on which an input is made on the touch panel 13.

An operation button 14 includes the operation buttons 14A to 14I, the L button, the R button, and the volume button described above, and is connected to the information processing section 31. Operation data representing an input state of each of the operation buttons 14A to 14I, the L button, the R button, and the volume button is outputted from the operation button 14 to the information processing section 31, and the input state indicates whether or not each of the operation buttons 14A to 14I has been pressed. The information processing section 31 acquires the operation data from the operation button 14 to perform a process in accordance with the input on the operation button 14.

The lower LCD 12 and the upper LCD 22 are connected to the information processing section 31. The lower LCD 12 and the upper LCD 22 each display an image in accordance with an instruction from the information processing section 31 (the GPU 312). In the present embodiment, the information processing section 31 causes the upper LCD 22 to display thereon an image representing an object of an animal (hereinafter, referred to as an animal object).

In addition to the aforementioned planar image, the aforementioned stereoscopic image also can be displayed on the upper LCD 22 as an image representing an animal object. Specifically, the information processing section 31 is connected to an LCD controller (not shown) of the upper LCD 22, and causes the LCD controller to set the parallax barrier to ON or OFF. When the parallax barrier is set to ON in the upper LCD 22, an image for a right eye and an image for a left eye which are stored in the VRAM 313 of the information processing section 31 are outputted to the upper LCD 22. More specifically, the LCD controller alternately repeats reading of pixel data of the image for a right eye for one line in the vertical direction, and reading of pixel data of the image for a left eye for one line in the vertical direction, thereby reading, from the VRAM 313, the image for a right eye and the image for a left eye. Thus, an image to be displayed is divided into the images for a right eye and the images for a left eye each of which is a rectangle-shaped image having one line of pixels aligned in the vertical direction, and an image, in which the rectangle-shaped image for the left eye which is obtained through the division, and the rectangle-shaped image for the right eye which is obtained through the division are alternately aligned, is displayed on the screen of the upper LCD 22. A user views the images through the parallax barrier in the upper LCD 22, so that the image for the right eye is viewed by the user's right eye, and the image for the left eye is viewed by the user's left eye. Thus, the stereoscopically image is displayed on the screen of the upper LCD 22.

As described above, it is determined whether to display the animal object as a stereoscopic image or as a planar image on the upper LCD 22, by switching the display mode by the 3D adjustment switch 25. In addition, even if the display mode is switched to the stereoscopic display mode by the 3D adjustment switch 25, the animal object is displayed as a planar image when the same image is displayed as an image for a left eye and an image for a right eye in accordance with a program executed by the information processing section 31.

The outer imaging section 23 and the inner imaging section 24 are connected to the information processing section 31. The outer imaging section 23 and the inner imaging section 24 each take an image in accordance with an instruction from the information processing section 31, and output data of the taken image to the information processing section 31. In the present embodiment, the information processing section 31 issues an instruction for taking an image to one of the outer imaging section 23 or the inner imaging section 24, and the imaging section which receives the instruction for taking an image takes an image and transmits data of the taken image to the information processing section 31. Specifically, in the present embodiment, a user selects the imaging section to be used through a touch operation using the touch panel 13 or the operation button 14. When the information processing section 31 (the CPU 311) detects that the imaging section is selected, the information processing section 31 instructs one of the outer imaging section 23 or the inner imaging section 24 to take an image.

The 3D adjustment switch 25 is connected to the information processing section 31. The 3D adjustment switch 25 transmits, to the information processing section 31, an electrical signal in accordance with the position of the slider.

The 3D indicator 26 is connected to the information processing section 31. The information processing section 31 controls whether or not the 3D indicator 26 is to be lit up. For example, the information processing section 31 lights up the 3D indicator 26 when the upper LCD 22 is in the stereoscopic display mode.

With reference to FIGS. 3 to 9C, the following will describe, as an example of the information processing program according to the present embodiment, the case where a game program is executed in the game apparatus 10 for displaying one or more animals on the upper LCD 22 and providing a user with pseudo contact with each animal approaching the user in accordance with a calling operation performed by the user. Further, the case where an animal object representing a puppy or a kitten as an animal is displayed on the upper LCD 22, will be described below as an example.

Although described later, in the game program, a process of determining whether or not an image taken by the inner imaging section 24 includes the face of a user; a process of detecting a characteristic point of the face from the image; a process of calculating a similarity degree Rd between characteristic points of faces which are detected from different images; a process of detecting later-described face parameters from the image; and the like are performed. However, in the present invention, any known technique is used for these processes, and thus the detailed description of these processes is omitted.

When the game program is executed, after an initialization process is performed, various pieces of data needed for executing the game program is read out from the external data storage memory 46 and stored in the main memory 32. In the present embodiment, as an example, the data initially read out from the external data storage memory 46 is face authentication data Dd and meeting frequency data Df. The face authentication data Dd and the meeting frequency data Df read out from the external data storage memory 46 are stored in the main memory 32 (see FIG. 10). The following will describe an example of the face authentication data Dd and the meeting frequency data Df.

(Face Authentication Data Dd)

The face authentication data Dd is an aggregate of personal authentication data indicating a characteristic point of the face of each user which has used the game apparatus 10 which executes the game program. Specifically, the face authentication data Dd is an aggregate of data in which personal authentication data, indicating a characteristic point of the face of each of one or more users which have used the game apparatus 10, is assigned a unique ID (identifier) indicating each user. In FIG. 3, the face authentication data Dd composed of personal authentication data for four users, which includes personal authentication data 1 having ID1 assigned thereto, to personal authentication data 4 having ID4 assigned thereto, is shown as an example.

Figures 5, 6:
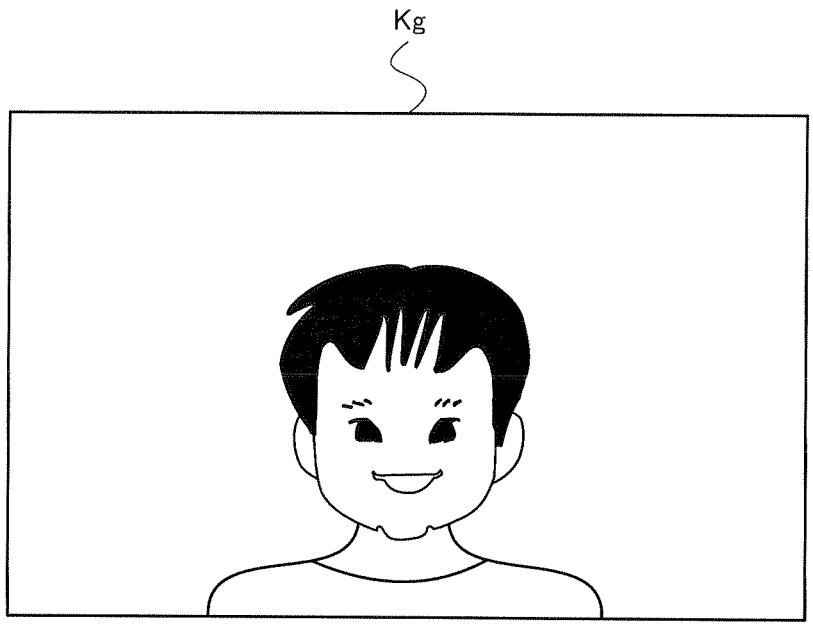
FIG. 5 is a diagram illustrating an example of an image of the face of the user which is taken by an inner imaging section 24.
FIG. 6 is a diagram illustrating another example of the data stored in the main memory 32 in accordance with the information processing program being executed.

A characteristic point of the face of a user is extracted from an image (hereinafter, referred to as a taken image Kg) taken by the inner imaging section 24 as described above when the user holds the game apparatus 10 as shown as an example in FIG. 4. FIG. 5 is a diagram illustrating an example of the taken image Kg. Data indicating the characteristic point extracted from the taken image Kg is registered in a later-described registration process as a piece of the personal authentication data constituting the face authentication data Dd.

The face authentication data Dd is used for identifying a user currently using the game apparatus 10 from among one or more users which previously have used the game apparatus 10. Although described in detail later, in the game program, the aforementioned taken image Kg is taken at an optional timing, and it is determined whether or not the taken image Kg includes a face. When it is determined that the taken image Kg includes the face, a characteristic point of the face included in the taken image Kg is extracted, face collation data Dc indicating the extracted characteristic point is generated. Therefore, the face collation data Dc is data indicating the characteristic point of the face of the user currently using the game apparatus 10. Then, the characteristic point indicated by the face collation data Dc is compared to the characteristic point indicated by each piece of the personal authentication data constituting the face authentication data Dd. Thus, a similarity degree Rd between the face collation data Dc and each piece of the personal authentication data is calculated. Then, identification of the current user is performed on the basis of the similarity degree Rd calculated for each piece of the personal authentication data.

When the user is not identified, data indicating the characteristic point indicated by the face collation data Dc is registered as a new piece of the personal authentication data constituting face authentication data Dd. Therefore, the face authentication data Dd includes the personal authentication data indicating the characteristic points of the faces of the users which previously have used the game apparatus 10, as well as the personal authentication data indicating the characteristic point of the face of the user currently using the game apparatus 10.

Further, in the present embodiment, as an example, the number of users which can be registered (hereinafter, referred to as registerable number Tks) is previously determined for the face authentication data Dd. In other words, in the present embodiment, as an example, the number of pieces of data which can be registered as the personal authentication data constituting the face authentication data Dd is previously determined as the registerable number Tks.

(Meeting Frequency Data Df)

Meanwhile, as shown as an example in FIG. 6, the meeting frequency data Df is data which indicates a frequency (hereinafter, referred to as meeting frequency Td) at which each of one or more users which have used the game apparatus 10 executing the game program contacts each of one or more animals in a pseudo manner, such that the frequency corresponds to each of the one or more users. In FIG. 6, the meeting frequency data Df which indicates the meeting frequency Td of each of ID1 to ID4 with each of puppies 1 to 3 and a kitten 1 such that the meeting frequency Td corresponds to each of ID1 to ID4, is shown as an example. In the present embodiment, as an example, each ID indicated by the meeting frequency data Df agrees with the ID of each user in the face authentication data Dd. Thus, the meeting frequency Td can be managed for each piece of the personal authentication data constituting the face authentication data Dd, namely, for each user which has used the game apparatus 10. In addition, in the present embodiment, as an example, since the ID of each user indicated by the meeting frequency data Df agrees with and corresponds to the ID of each user in the face authentication data Dd, the number of users which can be registered in the meeting frequency data Df is the same as the registerable number Tks of the face authentication data Dd.

Each meeting frequency Td is updated for each user. Then, as shown as an example in FIG. 6, in the meeting frequency data Df, last update date and time when the meeting frequency Td is updated last is indicated so as to correspond to each user. In the present embodiment, as an example, when a user is identified, if a predetermined period (hereinafter, referred to as update period Rk) has elapsed from the last update date and time corresponding to the identified user, the meeting frequency Td of the identified user with each animal is increased by one and updated.

Here, the meeting frequency data Df is also data which indicates a state of an animal which is not directly taken care of by a user, for example, a state of a puppy 3 shown as an example in FIG. 6, which is left in a pet hotel. For an animal which is in a state of not being directly taken care of by a user, the meeting frequency Td is not updated even when the update period Rk has elapsed. Thus, the meeting frequency Td is a value indicating a frequency at which the user contacts the animal in a pseudo manner as described above.

In the present embodiment, as an example, the update period Rk is set to have a length of six hours.

This is the description of the example of the face authentication data Dd and the meeting frequency data Df.

(Animal Object Data)

The following will describe animal object data. In the present embodiment, as an example, when the face authentication data Dd and the meeting frequency data Df are read out, one or more pieces of animal object data which indicate one or more animals indicated by the meeting frequency data Df are read out from the external data storage memory 46. Note that animal object data of an animal which is set to be in a state of not being directly taken care of by a user in the meeting frequency data Df stored in the main memory 32 as described above is not read out.

As an example, the animal object data includes shape data which is previously determined to indicate an outer shape of a puppy or a kitten in a virtual space. Further, as an example, the animal object data also includes control amount data which indicates, as control amounts, a reference position in the shape data, a position of each joint relative to the reference position, and a rotation angle of each joint. Each control amount indicated in the control amount data included in the animal object data is controlled on the basis of a predetermined motion pattern, thereby controlling a motion of an animal object.

As an example, the motion pattern is a pattern which is previously determined to indicate a temporal change of each of the reference position, the position of each joint, and the rotation angle of each joint, which are indicated as the control amounts, respectively, in the control amount data as described above. An example of the motion pattern is a walking motion pattern which is previously determined such that an animal object which is a control target is displayed so as to perform a walking motion. Each control amount indicated by the control amount data included in the animal object data indicating the animal object which is the control target is controlled so as to be temporally changed in accordance with the walking motion pattern, thereby controlling the animal object, which is the control target, such that the animal object performs a walking motion. When each control amount is controlled so as to be temporally changed, the shape indicated by the shape data included in the same animal object data is also controlled together with the control amount data indicating the control amounts. When the shape indicated by the shape data is controlled, the shape is controlled so as to be deformed following the temporal change of each control amount indicated by the control amount data included in the same animal object data. Thus, when the animal object which is the control target is controlled in accordance with the walking motion pattern, the animal object is displayed on the upper LCD 22 such that the animal object performs a walking motion. The same applies to predetermined motion patterns other than the walking motion pattern.

Each piece of the animal object data read out from the external data storage memory 46 is stored in the main memory 32 as object data Dg which is composed of each piece of the animal object data. When the object data Dg is stored in the main memory 32, an animal object indicated by each piece of the animal object data constituting the stored object data Dg is located at an initial position in a room in the virtual space and displayed on the upper LCD 22.

For each animal object which is located at the initial position in the room in the virtual space and displayed on the upper LCD 22, various motions are set such that each animal represented by each animal object is displayed as if being living on their own will, such as relaxing, walking around, and lying sideways, without contacting a user. As will be described later, in the present embodiment, as an example, various motions are set such that, when a motion of an animal object is controlled, the animal object is displayed on the upper LCD 22 so as to perform various motions, such as a motion of joyfully approaching the user, a motion of merely approaching the user, a motion of approaching the user on alert, a motion of licking the user's face, a motion of inclining its face, and a motion of turning its face toward the user.

In the present embodiment, as an example, motion pattern data for such various motions is previously stored in the external data storage memory 46. The motion pattern data stored in the external data storage memory 46 is read out after the object data Dg. Each piece of the motion pattern data read out from the external data storage memory 46 is stored in the main memory 32 as pattern data Dl which is composed of each piece of the motion pattern data. When a motion is set for an animal object, a piece of the motion pattern data which corresponds to the set motion, among the motion pattern data constituting the pattern data Dl stored in the main memory 32, is referred to. In accordance with the referred piece of the motion pattern data, the control amounts indicated by the control amount data included in the animal object data of the control target, and the shape indicated by the shape data included in the animal object data, are controlled. The control of the animal object is continued from the start until an end timing of a period of the temporal change indicated by the piece of the motion pattern data.

(Face Authentication Process)

When each animal object is displayed on the upper LCD 22, a taken image Kg is taken, and a face authentication process is started which uses the face collation data Dc generated on the basis of the taken image Kg. In the present embodiment, as an example, before performing the face authentication process, it is determined whether or not the taken image Kg includes a face. When it is determined that the taken image Kg includes the face, face collation data Dc indicating a characteristic point of the included face is generated, and the face authentication process is performed as described below. On the other hand, when it is determined that the taken image Kg does not include the face, the user cannot be identified. This is because, when the taken image Kg does not include the face, a characteristic point of the face cannot be extracted and the face collation data Dc cannot be generated. Thus, when it is determined that the taken image Kg does not include the face, the later-described face authentication process and a registration process subsequent to the face authentication process are not performed, and later-described authentication result data De is updated so as to be Null. Then, a process of determining whether or not an operation which is a trigger for a later-described motion control process has been performed by the user, is performed.

In the face authentication process, first, the taken image Kg taken as described above is analyzed, and the characteristic point of the included face is extracted from the taken image Kg. Then, data indicating the extracted characteristic point is generated as the face collation data Dc. Then, the generated face collation data Dc is collated with the already registered face authentication data Dd.

When the face collation data Dc is collated with the face authentication data Dd, the characteristic point indicated by the face collation data Dc is compared to the characteristic point indicated by each piece of the personal authentication data constituting the face authentication data Dd. Then, by the face collation data Dc being compared to each piece of the personal authentication data, a similarity degree Rd between the characteristic points indicated by both data is calculated for each piece of the personal authentication data. When the similarity degree Rd is calculated for each piece of the personal authentication data constituting the face authentication data Dd, the highest similarity degree Rd is selected from among the calculated similarity degrees Rd. Then, when the highest similarity degree Rd exceeds a predetermined first similarity degree threshold th1, a user indicated by an ID assigned to the personal authentication data having the highest similarity degree Rd is identified as a user currently using the game apparatus 10. When the user is identified, authentication result data De indicating the ID of the identified user is generated.

Note that, for example, when there is no personal authentication data having a similarity degree Rd which exceeds the first similarity degree threshold th1, it is determined that the user is not identified. In the present embodiment, as an example, when the user is not identified in the face authentication process, the authentication result data De indicating Null which indicates that the user is not identified, is generated.

When the authentication result data De indicating the ID of the user or Null is generated, the face authentication process ends. In the present embodiment, as an example, when the face authentication process ends, the registration process is subsequently started.

(Registration Process)

The following will describe an example of the registration process. When the registration process is started, first, it is determined whether or not the user is identified in the aforementioned face authentication process. First, the case where it is determined that the user is not identified will be described.

Specifically, the case where it is determined that the user is not identified is, for example, the case where Null is indicated by the authentication result data De as described above. In this case, in the registration process, as an example, the face authentication data Dd and the meeting frequency data Df are updated such that a user having the face with the characteristic point indicated by the face collation data Dc (the user currently using the game apparatus 10) is identified in the face authentication process at or after the next time. When the face authentication data Dd and the meeting frequency data Df are updated, first, it is determined whether or not personal authentication data can be newly registered as a piece of the personal authentication data constituting the face authentication data Dd. Specifically, it is determined whether or not the current number of pieces of the personal authentication data in the face authentication data Dd (hereinafter, referred to as registration number Ts) is equal to the aforementioned registerable number Tks.

When the registration number Ts of the personal authentication data is equal to the registerable number Tks, personal authentication data to be deleted is selected from among the already registered personal authentication data, such that new personal authentication data can be registered. When the personal authentication data to be deleted is selected, first, the meeting frequency data Df is referred to, and the ID of a user corresponding to the lowest meeting frequency Td among meeting frequencies Td which have not been updated for a deletion determination period Sk or longer, is identified from among the users indicated by the meeting frequency data Df. When the ID of the user is identified as described above, the personal authentication data having the identified ID assigned thereto is deleted from the face authentication data Dd, and the meeting frequency Td of the user of this ID with each animal is also deleted from the meeting frequency data Df. Then, a unique ID is assigned to data indicating the characteristic point of the face of the current user which is indicated by the face collation data Dc, and this data is newly registered as a piece of the personal authentication data constituting the face authentication data Dd. In addition, the meeting frequency Td of the user of this ID with each animal is registered in the meeting frequency data Df.

Note that, in the present embodiment, when personal authentication data of a new user is registered, an initial value of the meeting frequency Td with each animal, which is registered in the meeting frequency data Df, is set to, for example, 50 such that a motion of an animal object merely approaching the user is set in a later-described animal control process.

On the other hand, when there is no meeting frequency Td which has not updated for the deletion determination period Sk or longer, the ID of a user corresponding to the lowest meeting frequency Td among the meeting frequencies Td indicated by the meeting frequency data Df, is identified. Then, the personal authentication data having the identified ID of the user assigned thereto is deleted from the face authentication data Dd, and the meeting frequency Td of the user of this ID with each animal is deleted from the meeting frequency data Df. Thereafter, a new, unique ID is assigned to data indicating the characteristic point indicated by the face collation data Dc, and this data is registered as a piece of the personal authentication data constituting the face authentication data Dd. In addition, a meeting frequency Td of the user of this ID with each animal is registered in the meeting frequency data Df.

In the present embodiment, as an example, an initial value of the meeting frequency Td which is registered in the meeting frequency data Df when new personal authentication data is registered is any value as long as the value is previously determined in view of a motion of a animal object which is set in the motion control process described in detail later. For example, when new personal authentication data is registered, it is considered that the user having the face with the characteristic point indicated by the personal authentication data meets, for the first time, each animal which corresponds to the user in the meeting frequency data Df. Then, as will be described later, an example of a motion, to a new user, which is set in the motion control process for each animal object representing an animal, is a motion of merely approaching the user. When the motion of merely approaching the user is set for each animal object as a motion to the new user, a value which is less than a later-described first meeting frequency threshold thm1 and equal to or more than a later-described second meeting frequency threshold thm2 may be previously set as an initial value of the meeting frequency Td.

When personal authentication data and meeting frequencies Td of a new user are registered, it is considered that the user is identified, and the authentication result data De indicating Null is updated with data indicating the ID of the newly registered user. Thus, even when it is determined that the user is not identified when the registration process is started as described above, the authentication result data De when the registration process is completed becomes data indicating the ID of the identified user, except the case where the taken image Kg does not include a face as described above.

The following will describe the case where, when the registration process is started, it is determined that the user is identified in the face authentication process. As is obvious from the above description, the case where, when the registration process is started, it is determined that the user is identified in the face authentication process, is the case where the user having the face with the characteristic point indicated by the personal authentication data which has been registered prior to the start of the registration process is currently using the game apparatus 10. Specifically, this case is the case where the ID of the user is indicated by the authentication result data De when the registration process is started (namely, the authentication result data De does not indicate Null). In the present embodiment, as an example, when it is determined in the registration process that the user is identified, a process for updating the meeting frequency Td indicated by the meeting frequency data Df is performed.

The procedure of updating the meeting frequency data Df is as follows. First, last update date and time corresponding to the user of the ID indicated by the authentication result data De, among the IDs indicated by the meeting frequency data Df, is referred to. When the period from the referred last update date and time to the current time is equal to or longer than the aforementioned update period Rk, the meeting frequency Td of the user of the ID indicated by the authentication result data De, with each animal, is increased by one and updated. Note that, as described above, the meeting frequency Td with an animal which is in a state of not being directly taken care of by the user is not updated. In addition, when the meeting frequency Td is updated, the last update date and time corresponding to the updated meeting frequency Td is also updated with the current date and time.

When the meeting frequency data Df is updated, a process for updating the characteristic point indicated by the personal authentication data of the identified user, with the characteristic point of the face of the current user, is performed. In the process for updating the personal authentication data, first, it is determined whether or not the face having the characteristic point indicated by the face collation data Dc closely resembles the face having the characteristic point indicated by the personal authentication data of the identified user. Specifically, for example, in the case where the similarity degree Rd is calculated by a calculation method in which the maximum value is calculated as 100, a second similarity degree threshold th2 is previously set so as to be higher than the above first similarity degree threshold th1 and close to 100 (e.g., the second similarity degree threshold th2 is previously set to 97). Then, when the similarity degree Rd between the characteristic point indicated by the face collation data Dc and the characteristic point indicated by the personal authentication data of the identified user is equal to or more than the second similarity degree threshold th2, it is determined that the faces having the characteristic points indicated by both data closely resemble each other. When it is determined that the faces closely resemble each other, the characteristic point indicated by the personal authentication data of the identified user is updated with data indicating the characteristic point of the face of the current user, namely, the characteristic point indicated by the face collation data Dc. By updating the personal authentication data with the face collation data Dc indicating the current characteristic point of the identified user as described above, for example, the case where, when the face of a user has changed due to growth or the like, the same user is not identified is prevented from occurring. Note that the second similarity degree threshold th2 may be any value as long as it can be determined whether or not the faces closely resemble each other, by comparing this value to the similarity degree Rd between the characteristic point of the face of the current user and the characteristic point indicated by the personal authentication data registered as data indicating the characteristic point of the face of the current user.

This is the description of the example of the registration process. In the present embodiment, as an example, when the registration process ends, it is determined whether or not an operation which is a trigger for the later-described motion control process has been inputted by the user.

(Motion Control Process)

The following will describe an example of a method of determining whether or not an operation which is a trigger for the motion control process has been inputted by the user. In the present embodiment, the operation which is the trigger for the motion control process is an operation for calling an animal. Specifically, examples of the operation for calling an animal include: a touch input performed by drawing, on the touch panel 13, a track of a motion, such as waving a hand, which is performed when calling an animal; and an sound input performed by the user for calling an animal (e.g., an input of a voice calling the name of an animal, an input of a whistling sound, and an input of a clapping sound).

In the present embodiment, as an example, a voice of the user (including a sound made by the user) is detected by the microphone 43, and an audio signal indicating the detected voice is outputted from the microphone 43. The audio signal outputted form the microphone 43 is converted into audio data in a predetermined format by the I/F circuit 42. Thus, in the present embodiment, in order to determine whether or not a sound made for calling an animal has been inputted by the user as an operation which is a trigger for the motion control process, as an example, trigger determination audio data for comparing thereto the audio data indicating the sound made by the user for calling an animal is previously stored and registered in the external data storage memory 46.

An example of a method of previously registering the trigger determination audio data in the external data storage memory 46 is a method in which a scene for previously registering the trigger determination audio data is provided. Specifically, an example of the above method is a method of executing a trigger determination sound registration program, for causing the user to previously register trigger determination audio data, as the information processing program according to the present embodiment, in addition to the game program described later in detail with reference to flowcharts in FIGS. 11A to 17. A timing for executing the trigger determination sound registration program may be any timing as long as it is prior to executing the game program in the game apparatus 10 for the first time. When the trigger determination sound registration program is executed as described above, audio data indicating a sound inputted while this program is executed can be previously stored as trigger determination audio data in the external data storage memory 46. In the present embodiment, as an example, after the initialization process in the game program, the trigger determination audio data stored in the external data storage memory 46 is read out from the external data storage memory 46 and stored in the main memory 32.

In the present embodiment, as an example, when it is determined whether or not a sound for calling an animal has been inputted by the user, it is determined whether or not audio data indicating a sound detected when this determination is performed substantially agrees with trigger determination audio data Di stored in the main memory 32. Then, when the sound indicated by the audio data which substantially agrees with the trigger determination audio data Di has been inputted, it can be determined that the sound for calling an animal has been inputted by the user.

Meanwhile, when it is determined whether or not a touch input has been performed as an operation which is a trigger for the motion control process, touch position data Dk stored in the main memory 32 is referred to. When it is determined that a latest history indicated by the touch position data Dk indicates a touch position TP, before it is determined that a sound for calling an animal has been inputted by the user, the history indicated by the touch position data Dk is further referred to, and the content of the touch input as the operation which is the trigger for the motion control process is determined. When it is determined that the determined content is an input of drawing a track of a motion performed when calling an animal as described above, it is determined that the touch input has been performed as the operation which is the trigger for the motion control process.

When it is determined that the operation for calling an animal has been inputted by the user as the operation which is the trigger for the motion control process, this operation is taken as a trigger, and the motion control process of controlling, in accordance with the identified user, a motion of each animal object displayed on the upper LCD 22, is started. The following will describe an example of the motion control process. Hereinafter, as an example of the motion control process, the case will be described where a motion of each animal object displayed on the upper LCD 22 is controlled such that each animal object is displayed so as to approach the user in response to calling from the user, as described above.

In the motion control process, a motion of each animal object is set on the basis of each meeting frequency Td corresponding to the identified user. Thus, when the motion control process is started, it is determined whether or not the user is identified. Specifically, it is determined whether or not Null is indicated by the authentication result data De. When Null is not indicated by the authentication result data De, the meeting frequency data Df is referred to. Here, the case where Null is not indicated by the authentication result data De is the case where the ID of the user is indicated by the authentication result data De (in other words, the authentication result data De does not indicate Null). When the meeting frequency data Df is referred to, specifically, the meeting frequency Td with each animal, corresponding to the ID of the identified user (the ID indicated by the authentication result data De), is referred to from among each meeting frequency Td indicated by the meeting frequency data Df. Then, a motion of the animal object representing each animal, which is performed when approaching the user in response to calling from the user, is set in accordance with the referred meeting frequency Td with each animal.

In the present embodiment, as an example, in order to set a motion of the animal object, the first meeting frequency threshold thm1 and the second meeting frequency threshold thm2 lower than the first meeting frequency threshold thm1 are previously set. Hereinafter, the description will be continued on the assumption that, as an example, 70 is previously set as the first meeting frequency threshold thm1 and 30 is previously set as the second meeting frequency threshold thm2.

As described above, the previously set first meeting frequency threshold thm1 and second meeting frequency threshold thm2 are compared to the meeting frequency Td with each animal which is represented by each animal object displayed on the upper LCD 22. It is considered that a meeting frequency Td which is more than the first meeting frequency threshold thm1 is relatively high and an animal object representing an animal having this meeting frequency Td is well attached to the user currently using the game apparatus 10, and a motion of the animal object is set so as to joyfully approach the user. In addition, it is considered that a meeting frequency Td which is equal to or more than the second meeting frequency threshold thm2 and less than the first meeting frequency threshold thm1 is between these thresholds, and an animal object representing an animal having this meeting frequency Td is not well attached to the user currently using the game apparatus 10, and a motion of the animal object is set so as to merely approach the user. Moreover, it is considered that a meeting frequency Td which is less than the second meeting frequency threshold thm2 is relatively low and an animal object representing an animal having this meeting frequency Td is not attached to the user currently using the game apparatus 10 at all, and a motion of the animal object is set so as to approach the user on alert. Then, when a motion performed when approaching the user is set for each animal object, the motion pattern data indicating the motion which is set for each animal object is referred to. Then, the motion of each animal object is controlled based on the referred motion pattern data as described above.

On the other hand, if, when the motion control process is started, it is determined that the user is not identified, setting of a motion corresponding to the user cannot be performed. Thus, in the present embodiment, when it is determined that the user is not identified, a motion of merely approaching the user is set as a motion of each animal object displayed on the upper LCD 22.

Figure 7A:
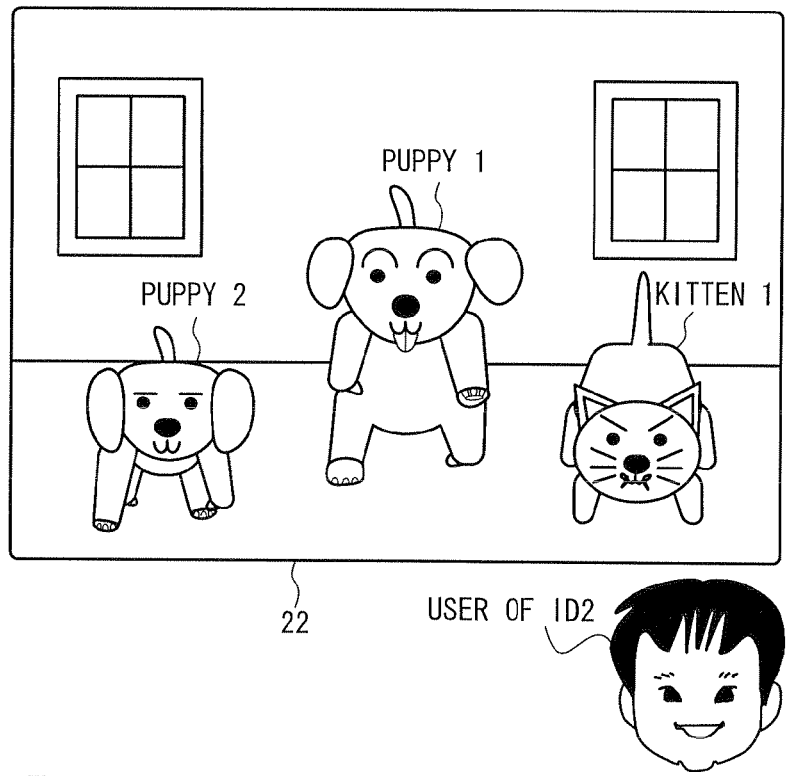
FIG. 7A is a diagram illustrating an example of a screen displayed in accordance with the information processing program being executed.

In FIG. 7A, animals each approaching the user with a motion which is set in accordance with the meeting frequency Td of each animal corresponding to the ID of the identified user are displayed on the upper LCD 22. FIG. 7A illustrates an example of each animal object when the user of ID2 in the meeting frequency data Df shown as an example in FIG. 6 calls each animal object. For example, of the meeting frequencies Td corresponding to the user of ID2, the meeting frequency Td with a puppy 1 is 70, as shown an example in FIG. 6, which is equal to or more than the first meeting frequency threshold thm1. Thus, a motion of this animal object is set and controlled so as to joyfully approach the user as shown in FIG. 7A. In addition, for example, of the meeting frequencies Td corresponding to the user of ID2, the meeting frequency Td with a puppy 2 is 50, as shown as an example in FIG. 6, which is equal to or more than the second meeting frequency threshold thm2 and less than the first meeting frequency threshold thm1. Thus, a motion of this animal object is set and controlled so as to merely approach the user as shown in FIG. 7A. Further, for example, of the meeting frequencies Td corresponding to the user of ID2, the meeting frequency Td with a kitten 1 is 25, as shown as an example in FIG. 6, which is less than the second meeting frequency threshold thm2. Thus, a motion of this animal object is set and controlled so as to approach the user on alert as shown in FIG. 7A.

Figure 7B:
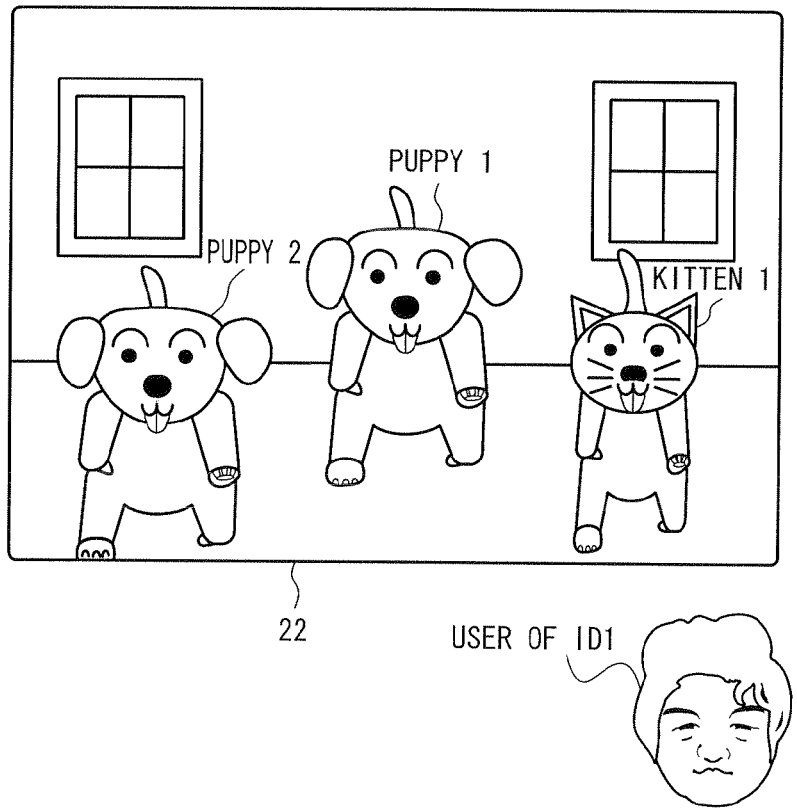
FIG. 7B is a diagram illustrating another example of the screen displayed in accordance with the information processing program being executed.

FIG. 7B is a diagram illustrating another example of a scene in which a motion of each animal object representing each animal is controlled in accordance with the meeting frequency Td of each animal corresponding to the ID of the identified user. FIG. 7B illustrates an example of a motion of each animal object representing each animal when the user of ID1 in the meeting frequency data Df shown as an example in FIG. 6 calls each animal object. For example, all the meeting frequencies Td corresponding to the user of ID1 are equal to or more than first meeting frequency threshold thm1 as shown as an example in FIG. 6. Thus, a motion of each animal object is set and controlled such that each animal joyfully approaches the user as shown in FIG. 7B.

As described above, in the present embodiment, the animal object representing each animal is controlled on the basis of the meeting frequency Td of each animal corresponding to the identified user.

As described above, a motion of each animal object is controlled so as to approach the user in response to calling from the user. In the virtual space, a position where each animal object is considered to have approached the user is previously determined. Then, when the motion of each animal object is controlled in response to calling from the user, the control is continued until the animal object moves to this position. When each animal object has moved to the position where the animal object is considered to have approached the user, the motion control process is ended, and a silhouette of the animal object is displayed on the lower LCD 12. By displaying the silhouette of the animal object, which is displayed on the upper LCD 22, on the lower LCD 12 as described above, the user can perform a touch input on the silhouette displayed on the lower LCD 12. In other words, by displaying the animal object on the upper LCD 22 and displaying its silhouette on the lower LCD 12 so as to allow a touch input to be performed thereon, the user can be provided with an operation feel as if directly touching the animal object, by performing a touch input on the silhouette (see FIG. 4).

Here, in the present embodiment, as an example, when each animal object approaches the user and the motion control process is ended, a process is started for providing the user with pseudo contact with each animal object having approached the user. Specifically, a process is started in which the user can contact in a pseudo manner each animal object, which is displayed on the upper LCD 22 and has approached the user, by performing a touch input on the silhouette displayed on the lower LCD 12 or making a sound (a voice for calling the animal object or clapping).

The following will describe an example of the process for providing the user with pseudo contact with each animal having approached the user. In the present embodiment, a detection motion control process of controlling each animal object representing each animal, on the basis of each parameter detected from the taken image Kg, may be performed as an example of the process for providing the user with pseudo contact with each animal. In addition, in the present embodiment, an object operation process of controlling each animal object representing each animal, in accordance with a voice input or a touch input performed by the user, may be performed as an example of the process for providing the user with pseudo contact with each animal. The following will describe, as an example, the case where the detection motion control process or the object operation process is selectively performed in accordance with whether or not any one of object operation inputs, namely, any one of a voice input or a touch input performed by the user, has been detected.

As will be described later, in the case where the detection motion control process or the object operation process is selectively performed, when the object operation input has not been detected, the detection motion control process is selected and performed. Thus, in the present embodiment, as an example, for the case where the object operation input is not detected after the motion control process is ended, a taken image Kg is taken by using the inner imaging section 24 and a process of updating face detection data Db on the basis of the taken image Kg is performed.

Figure 8:
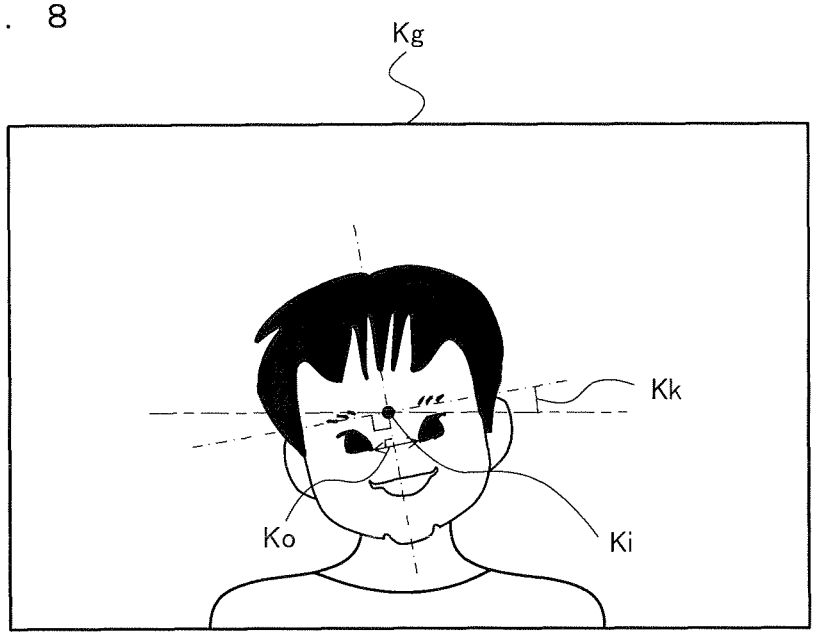
FIG. 8 is a diagram illustrating an example of face parameters detected in accordance with the information processing program being executed.

The following will describe an example of the process of updating the face detection data Db in the present embodiment. In the present embodiment, as an example, when the aforementioned motion control process is ended, a taken image Kg is taken for updating the face detection data Db. Then, when the taken image Kg includes a face, the face detection data Db is updated with each parameter which is detected on the basis of the taken image Kg. FIG. 8 is a diagram illustrating an example of each parameter detected from the taken image Kg in the present embodiment. In the present embodiment, as an example, an eye interval Ko between both eyes, a face inclination Kk, and a face position Ki are detected as parameters detected from the taken image Kg.

The eye interval Ko is detected as shown as an example in FIG. 8. Here, the eye interval Ko is thought to be proportional to the size of the face in the taken image Kg. In addition, the size of the face in the taken image Kg is thought to be proportional to the distance between the face of the user and the game apparatus 10 (the inner imaging section 24). Thus, in the present embodiment, the eye interval Ko is detected as an index for knowing how closely the face of the user approaches the game apparatus 10 (the inner imaging section 24). In addition, as shown as an example in FIG. 8, the face inclination Kk is detected as an angle at which a straight line parallel to a straight line connecting the inner ends of both eyes having the eye interval Ko therebetween is inclined relative to a horizontal axis of the taken image Kg. In the present embodiment, as an example, the sign of the face inclination Kk is defined such that a counterclockwise rotation direction in the taken image Kg is positive. Moreover, as shown as an example in FIG. 8, the face position Ki is detected as a central position of the face in the taken image Kg.

On the other hand, when the taken image Kg does not include the face, each of the aforementioned parameters cannot be detected. In the detection motion control process, processing is performed by using each of the aforementioned parameters. Thus, when the taken image Kg does not include the face, the object operation process is automatically selected and performed.

As described above, the eye interval Ko, the face inclination Kk, and the face position Ki are detected from the taken image Kg as parameters indicated by the face detection data Db, and the face detection data Db is updated with these parameters.

When the face detection data Db is updated as described above, the aforementioned detection motion control process or the aforementioned object operation process is selectively performed in accordance with a result of determination as to whether or not the above object operation input has been performed by the user.

(Detection Motion Control Process)

First, an example of the detection motion control process will be described. In the present embodiment, as an example, when the face detection data Db is updated, it is determined whether or not an object operation input performed by the user has been detected. When it is determined that the object operation input performed by the user has not been detected, the detection motion control process is selected and performed.

When the detection motion control process is started, the face detection data Db updated as described above is referred to. In the present embodiment, as an example, thresholds are set for the eye interval Ko and the face inclination Kk, respectively, out of each parameter indicated by the face detection data Db. Specifically, an interval threshold tho is previously set for the eye interval Ko, and an inclination threshold thk is previously set for the face inclination Kk.

In the detection motion control process, as an example, the eye interval Ko indicated by the face detection data Db is initially compared to the interval threshold tho. When the eye interval Ko is equal to or more than the interval threshold tho, it is considered that the user has moved their face close to the game apparatus 10. Thus, when the eye interval Ko is equal to or more than the interval threshold tho, a motion of each animal object displayed on the upper LCD 22 is set such that the animal object behaves as if licking the approached face of the user.

When the eye interval Ko is not equal to or more than the interval threshold tho, in the present embodiment, as an example, the face inclination Kk indicated by the face detection data Db is compared to the inclination threshold thk. When the face inclination Kk is equal to or more than the inclination threshold thk, a motion of each animal object displayed on the upper LCD 22 is set such that the animal object inclines its face at an angle indicated by the face inclination Kk, as shown in as an example in FIG. 9B.

When the face inclination Kk is not equal to or more than the inclination threshold thk, in the present embodiment, as an example, the face position Ki indicated by the face detection data Db is referred to. Then, as shown as an example in FIG. 9C, a motion of each animal object displayed on the upper LCD 22 is set so as to turn its face toward the user, on the basis of the referred face position Ki.

In the present embodiment, as an example, when control of each animal displayed on the upper LCD 22 is set in the detection motion control process, each animal object is controlled in accordance with a motion pattern corresponding to the motion which is set for each animal object, as described above.

(Object Operation Process)

Next, an example of the object operation process will be described. In the present embodiment, as an example, when the face detection data Db is updated after the aforementioned motion control process is ended, it is determined whether or not the above object operation input performed by the user has been detected. When the object operation input performed by the user has been detected, the detected object operation input is taken as a trigger, and the object operation process is started.

When the object operation process is started, first, it is determined whether or not a sound input has been detected as the object operation input which is the trigger for the object operation process. When it is determined whether or not the sound input has been detected as the object operation input taken which is the trigger for the object operation process, for example, it is determined whether a sound volume indicated by an audio signal outputted from the microphone 43 when the object operation input is detected is equal to or more than a predetermined sound volume threshold. When the sound volume indicated by the audio signal outputted from the microphone 43 is equal to or more than the sound volume threshold, it is determined that the sound input has been detected as the object operation input.

Further, in the present embodiment, as an example, voices indicating one or more instructions to an animal represented by each animal object, whistling sounds, and clapping sounds are assumed as sounds which are triggers for the object operation process. Then, when it is determined that the sound input has been detected as the object operation input, the content of the detected sound is determined.

In the present embodiment, in order to determine the content of the sound, as an example, sound determination data which indicates voices for instructions from the user to animals, whistling sounds, and clapping sound sand is to be compared to audio data, is stored and registered in the main memory 32.

An example of a method of registering the sound determination data in the external data storage memory 46 and the main memory 32 is a method in which a scene for previously registering the sound determination data is provided. Specifically, an example of the above method is a method of executing a sound registration program, for causing the user to previously register the sound determination data, as the information processing program according to the present embodiment, in addition to the game program described in detail later with reference to the flowcharts in FIGS. 11A to 17. When the sound input has been detected as the object operation input, the sound registration program may be executed with a predetermined probability to register the sound. When the sound registration program is executed as described above, audio data which indicates instructions, whistling sounds, and clapping sounds, which are made by the user in a state where the animal object has approached the user, is stored as sound determination data in the main memory 32.

In the present embodiment, as an example, when the sound determination data is stored in the main memory 32, sound determination data indicating each sound is stored as sound determination data constituting sound determination aggregate data Dj. In addition, in the present embodiment, as an example, each piece of the sound determination data constituting the sound determination aggregate data Dj stored in the main memory 32 is stored in the external data storage memory 46 with end of the game program. Moreover, in the present embodiment, as an example, each piece of the sound determination data stored in the external data storage memory 46 is read out after the initialization process in the game program, and stored in the main memory 32 as each piece of the sound determination data constituting the sound determination aggregate data Dj.

When the content of the sound is determined, the audio data indicating the sound which is the trigger for the object operation process is collated with each piece of the sound determination data constituting the sound determination aggregate data Dj stored in the main memory 32. When there is any piece of the sound determination data which substantially agrees with the audio data indicating the sound which the trigger for the object operation process, among each piece of the sound determination data stored in the main memory 32, it is determined that the sound of the content indicated by the sound determination data has been made by the user. On the other hand, when there is no piece of the sound determination data which substantially agrees with the audio data indicating the sound which is the trigger for the object operation process, among each piece of the sound determination data stored in the main memory 32, it is determined that each animal has not been able to understand the content of the sound.

When it is determined that the registered sound has been made by the user, a motion corresponding to the content of the determined sound is set as a motion of each animal object which is displayed on the upper LCD 22 and represents the animal. On the other hand, when it is determined that each animal has not been able to understand the content of the sound, a behavior of being embarrassed by the fact that the animal has not been able to understand the content of the sound is set as a motion of each animal object which is displayed on the upper LCD 22 and represents the animal.

On the other hand, when it is determined that a sound has not been inputted as the object operation input which is the trigger for the object operation process, it is determined whether or not a touch input has been detected as an object operation input. When it is determined whether or the touch input has been detected, the touch position data Dk stored in the main memory 32 is referred to. Then, if a touch position TP is indicated as a latest history by the referred touch position data Dk, it is determined that the touch input has been detected. When it is determined that the touch input has been detected, a history indicated by the touch position data Dk is referred to, and the content of the touch input detected as the object operation input is determined. Then, a motion of any one of the animals displayed on the upper LCD 22 is set on the basis of the determined content. For example, when it is determined, on the basis of the touch position history indicated by the touch position data Dk, that the content of the touch input is a slide input which reciprocates within a display region of the silhouette on the lower LCD 12, it is determined that a track of a motion of stroking the animal is drawn, and a motion of being pleased by the stroke is set as a motion of the animal object. Moreover, for example, when it is determined, on the basis of the touch position history indicated by the touch position data Dk, that the content of the touch input is a slide input which is performed on the touch panel 13 and directed in the downward direction of the lower LCD 12, it is determined that a track of a motion of a sign for lying down, and a motion of lying down is set as a motion of the animal object.

When no sound input or no touch input has been detected as an object operation input which is a trigger for the object operation process, no motion is set.

When a motion corresponding to the determined instruction is set for each of all the animal objects, or a motion corresponding to the content of the touch input is set for any one of the animals, the motion of each animal object whose motion has been set is controlled as described above.

Figure 10:
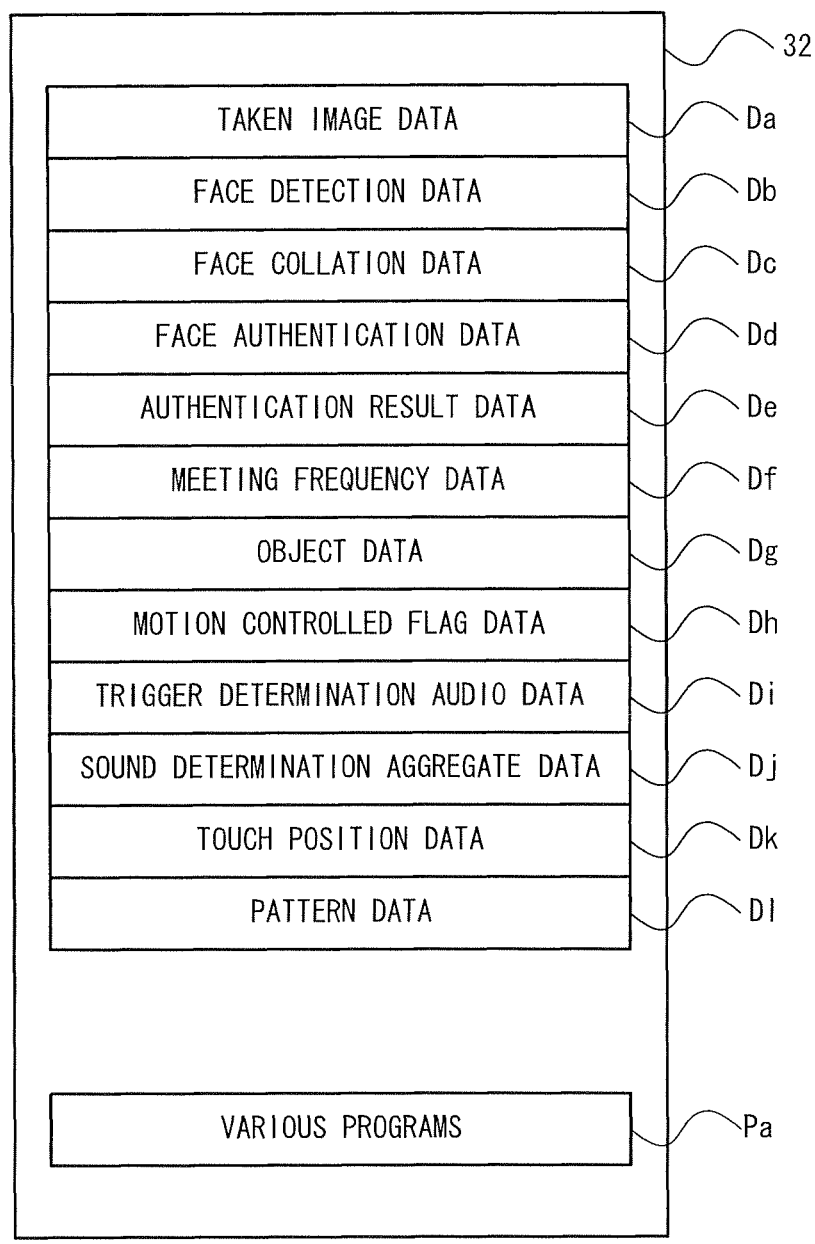
FIG. 10 is a diagram illustrating an example of various pieces of data stored in the main memory 32 in accordance with the information processing program being executed in the game apparatus 10 in FIG. 1.

Next, various pieces of data which are used when the information processing program is executed will be described with reference to FIG. 10, prior to description of processing performed in the game apparatus 10. In FIG. 10, programs read from the internal data storage memory 35, the external memory 45, the external data storage memory 46, and the like, temporary data generated in processing are stored in the main memory 32.

In FIG. 10, taken image data Da, the face detection data Db, the face collation data Dc, the face authentication data Dd, the authentication result data De, the meeting frequency data Df, and the like are stored in the main memory 32. In addition, in FIG. 10, various programs Pa including an information processing program are stored in a program storage area of the main memory 32.

The taken image data Da is data indicating the taken image Kg which is taken by the inner imaging section 24 as described above.

The face detection data Db is data indicating the eye interval Ko, the face inclination Kk, and the face position Ki, which are detected from the taken image Kg as described above.

The face collation data Dc is data indicating the characteristic point which is extracted from the taken image Kg which includes the face of the user currently using the game apparatus 10, as described above.

The face authentication data Dd is an aggregate of data in which a unique ID is assigned to personal authentication data indicating a characteristic point of each of the faces of users which have used the game apparatus 10 which executes the game program. In the present embodiment, as an example, the face authentication data Dd is stored in the external data storage memory 46, and is read out and stored in the main memory 32 when the game program is started.

As described above, the authentication result data De is data indicating the ID of the user currently using the game apparatus 10, when the user is identified from the IDs each assigned to each piece of the personal authentication data constituting the face authentication data Dd. Note that, when the user currently using the game apparatus 10 is not identified, the authentication result data De indicates Null as described above.

As described as an example with reference to FIG. 6, the meeting frequency data Df is data which indicates meeting frequencies Td of one or more users, which have used the game apparatus 10, with one or more animals, such that each meeting frequency Td corresponds to each user. The meeting frequency data Df is stored in the external data storage memory 46. When the information processing program is executed, the meeting frequency data Df is read out from the external data storage memory 46 and stored in the main memory 32.

The object data Dg is an aggregate of animal object data of the animals indicated by the meeting frequency data Df, as described above. In addition, each piece of the animal object data constituting the object data Dg includes the aforementioned control amount data and the aforementioned shape data.

Motion controlled flag data Dh is data indicating whether or not the motion control process has been performed. When the motion controlled flag data Dh is ON, it indicates that the motion control process has been executed. When the motion controlled flag data Dh is OFF, it indicates that the motion control process has not been executed.

As described above, the trigger determination audio data Di is audio data which is referred to when it is determined whether or not a sound for calling an animal has been inputted by the user as a sound which is a trigger for the motion control process.

As described above, the sound determination aggregate data Dj is an aggregate of sound determination data which is referred to when the content of a sound, which is a trigger for the object operation process, is determined.

The touch position data Dk is data generated by the touch panel control circuit as described above. The touch position data Dk indicates a coordinate of a position (touch position) at which an input is performed on the input surface of the touch panel 13. In addition, the touch position data Dk of the present embodiment includes, for example, a history which indicates Null or touch positions TP obtained in last processing of at least a predetermined number of times (e.g., 5 times). On the basis of the history, the content of a touch input is determined in the object operation process as described above.

As described above, the pattern data Dl is composed of motion pattern data which is previously determined to indicate temporal changes of a reference position, a position of each joint, and a rotation angle of each joint, which are indicated as control amounts by the control amount data included in the animal object data, such that an animal object is displayed so as to perform a set motion. The pattern data Dl is an aggregate of all pieces of motion pattern data corresponding to various motions which are settable in the game program.

Figure 11B:
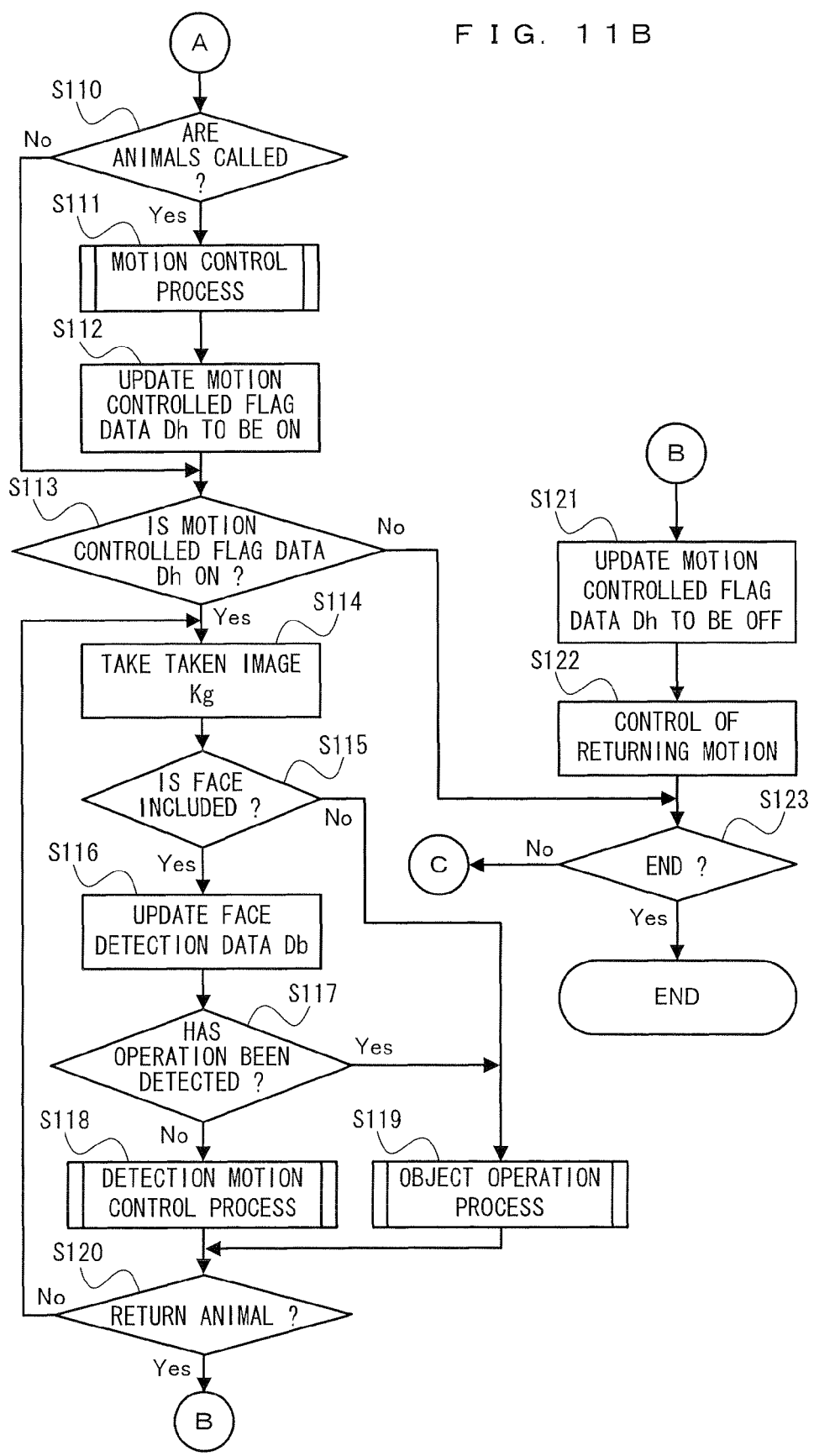
FIG. 11B is another flowchart showing the example of the information processing performed by the game apparatus 10 in FIG. 10 executing the information processing program.
Figure 12:
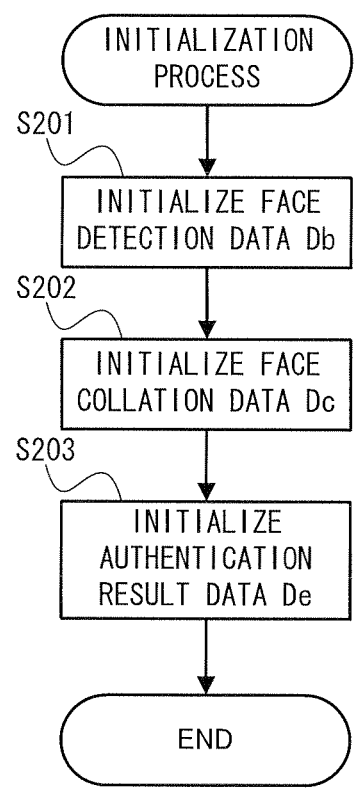
FIG. 12 is a flowchart of a subroutine showing in detail an initialization process performed at step 101 in FIG. 11A.
Figure 13:
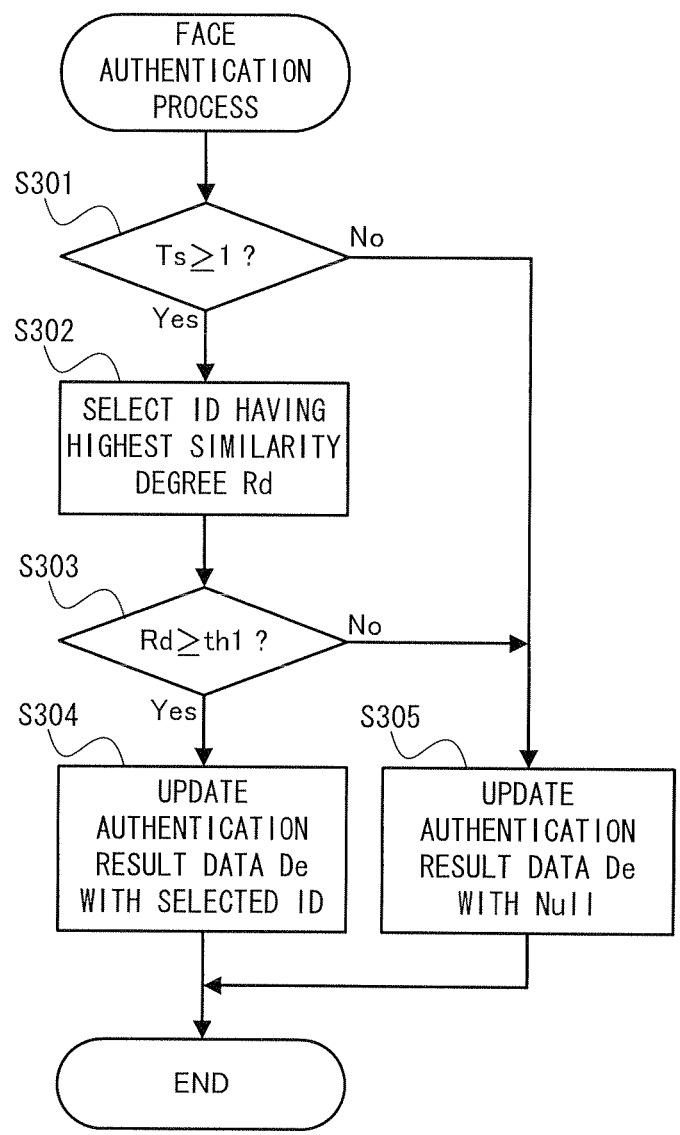
FIG. 13 is a flowchart of a subroutine showing in detail a face authentication process performed at step 107 in FIG. 11A.
Figure 14:
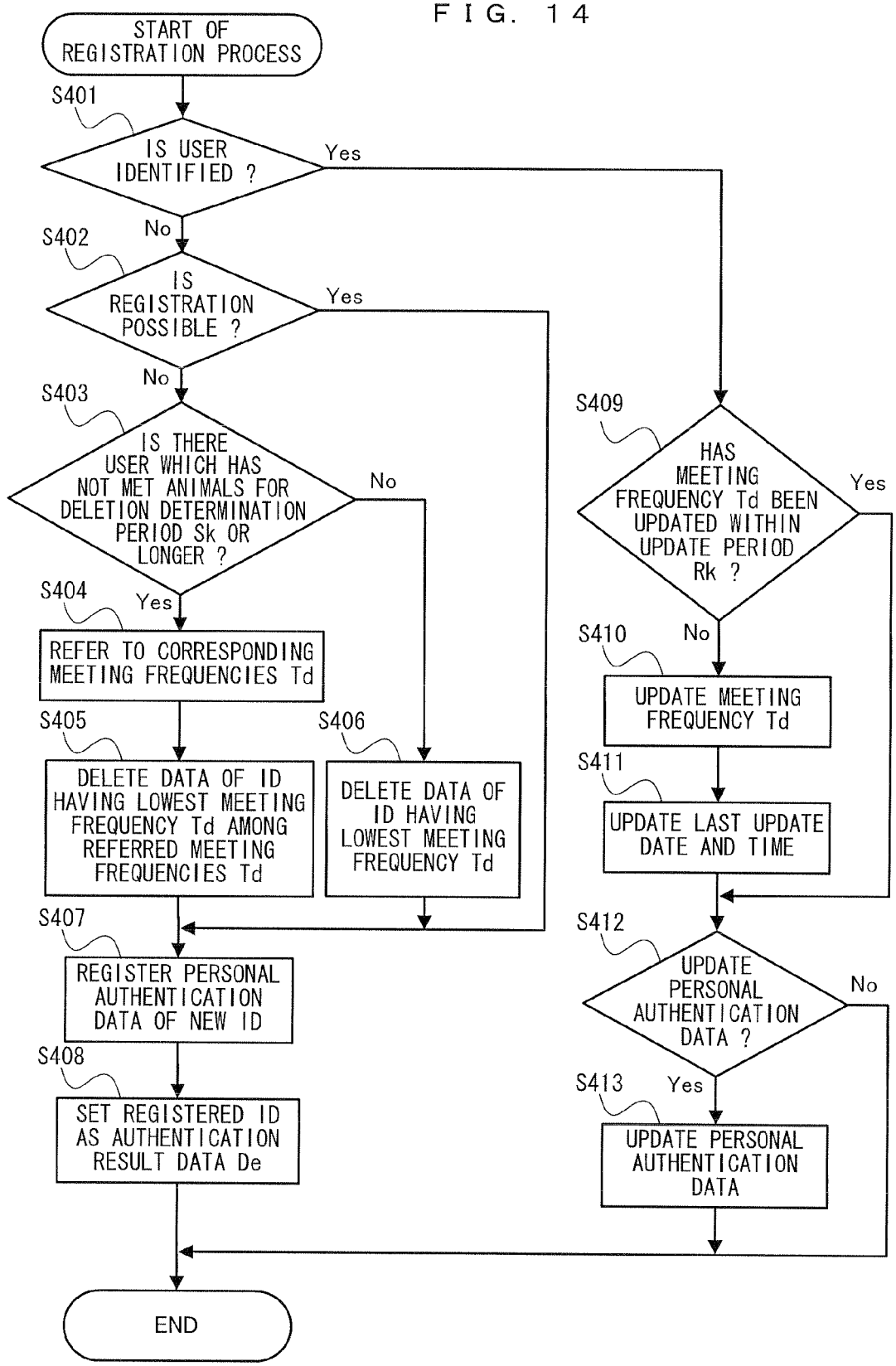
FIG. 14 is a flowchart of a subroutine showing in detail a registration process performed at step 108 in FIG. 11A.
Figure 15:
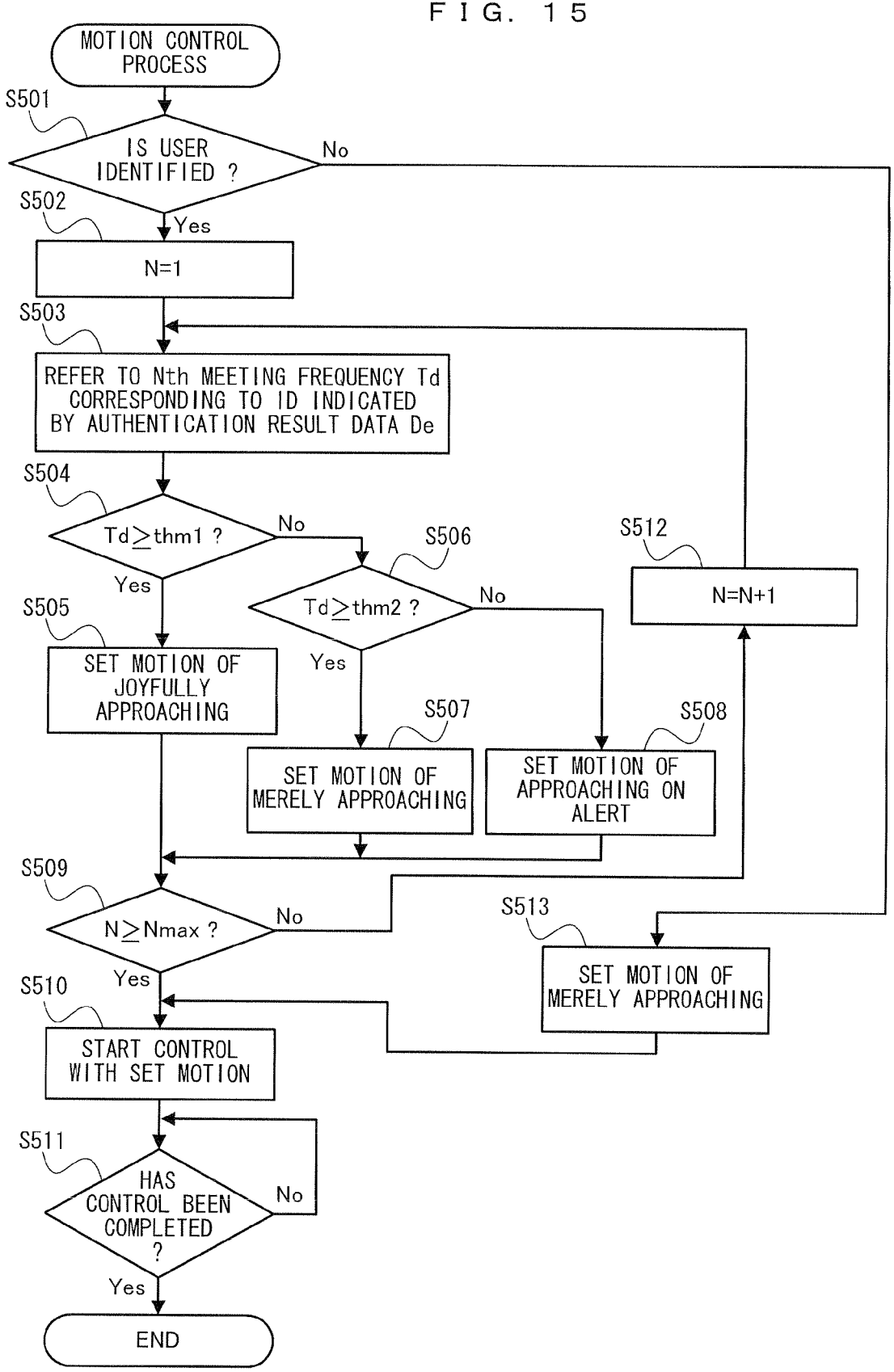
FIG. 15 is a flowchart of a subroutine showing in detail a motion control process performed at step 111 in FIG. 11B.
Figure 16:
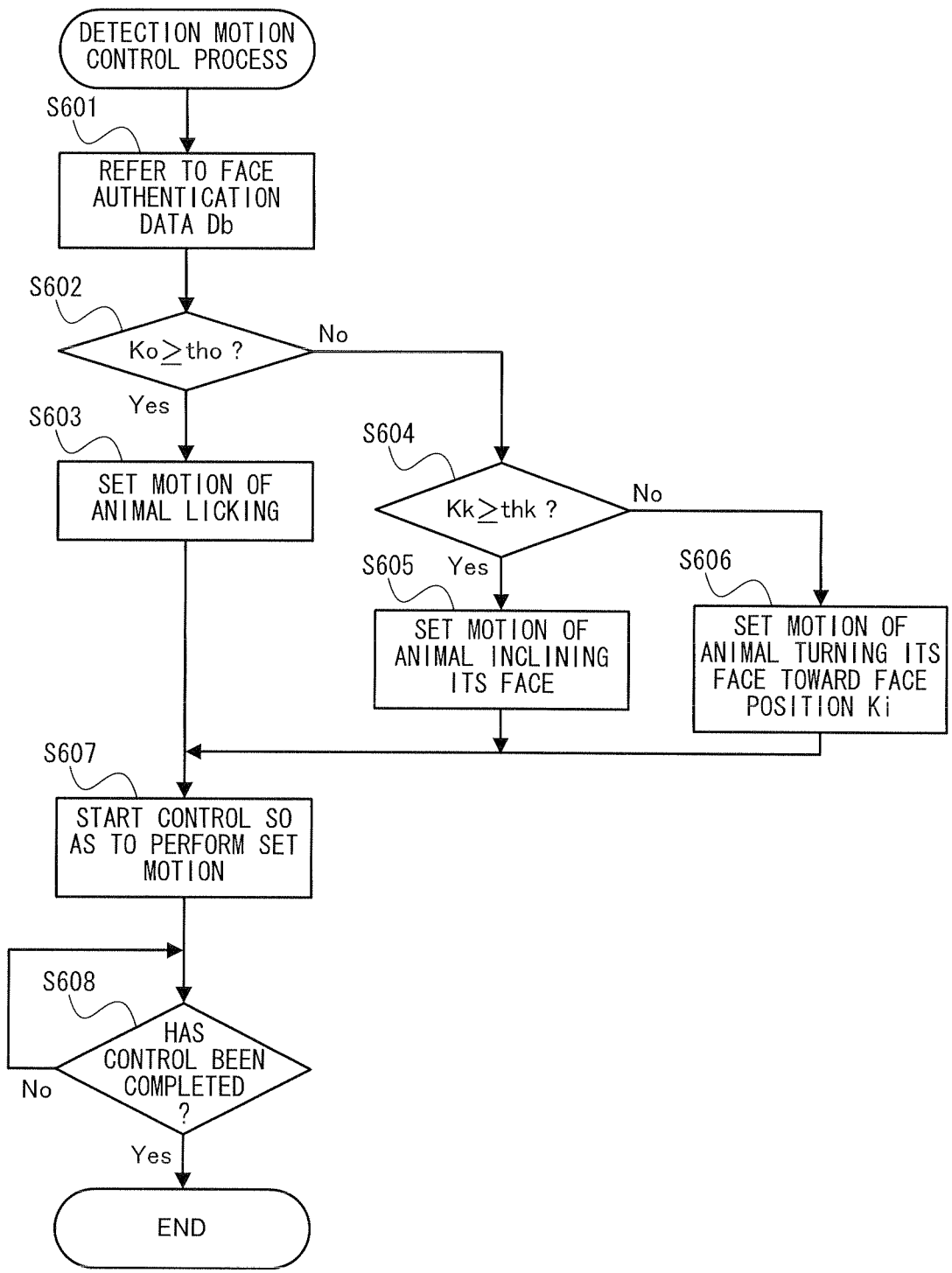
FIG. 16 is a flowchart of a subroutine showing in detail a detection motion control process performed at step 118 in FIG. 11B.
Figure 17:
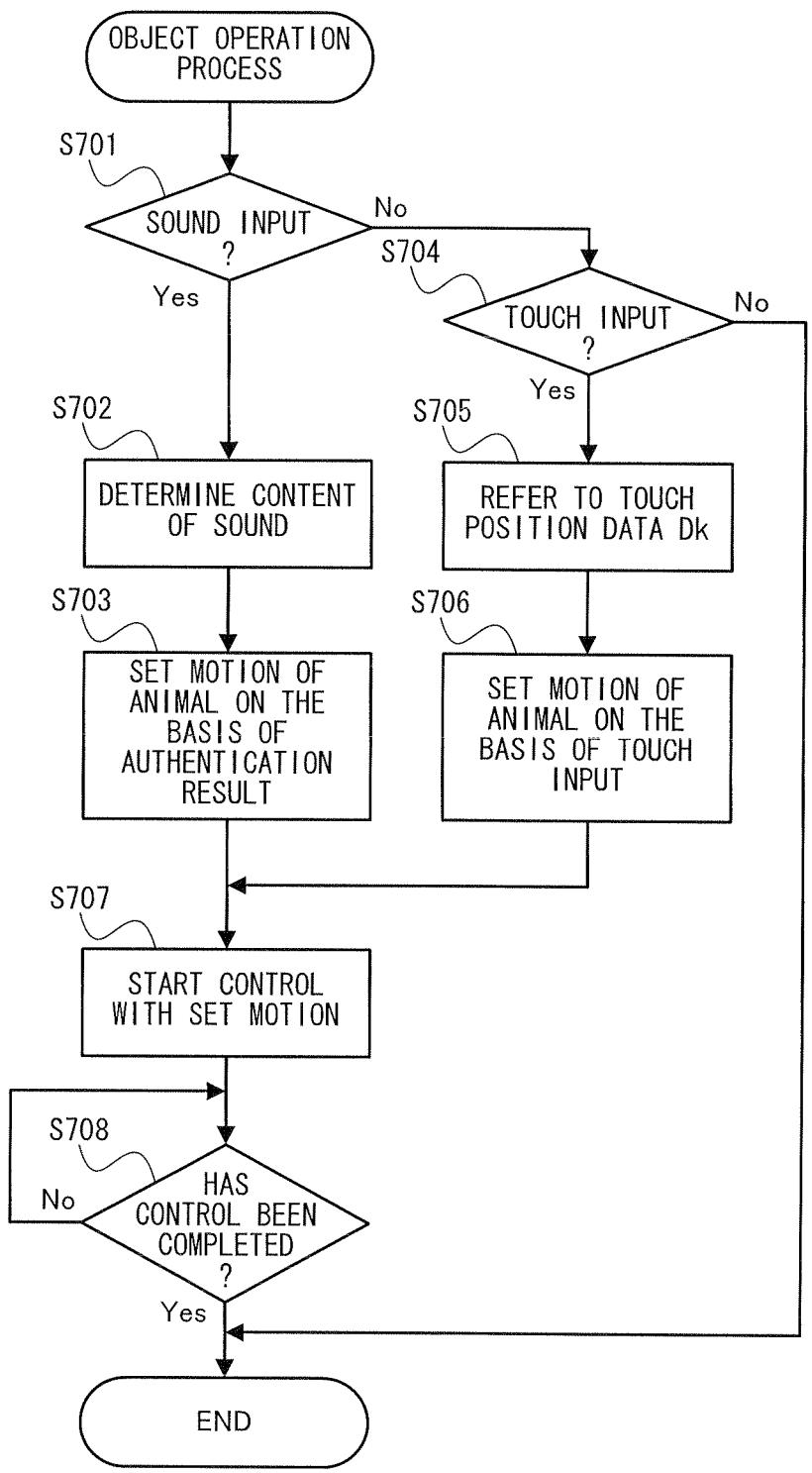
FIG. 17 is a flowchart of a subroutine showing in detail an object operation process performed at step 119 in FIG. 11B.

With reference to FIGS. 11A to 17, the following will describe a specific process performed by the information processing program which is executed in the game apparatus 10. FIGS. 11A and 11B are flowcharts showing an example where the game apparatus 10 performs information processing by executing the information processing program according to the present embodiment. FIG. 12 is a flowchart of a subroutine showing in detail an initialization process performed at step 101 in FIG. 11A. FIG. 13 is a flowchart of a subroutine showing in detail a face authentication process at step 107 in FIG. 11A. FIG. 14 is a flowchart of a subroutine showing in detail a registration process at step 108 in FIG. 11A. FIG. 15 is a flowchart of a subroutine showing in detail a motion control process at step 111 in FIG. 11B. FIG. 16 is a flowchart of a subroutine showing in detail a detection motion control process at step 118 in FIG. 11B. FIG. 17 is a flowchart of a subroutine showing in detail an object operation process at step 119 in FIG. 11B. Note that, in FIGS. 11A to 17, step is abbreviated as "S".

The program for performing theses processes is included in the programs stored in the internal data storage memory 35. When the power of the game apparatus 10 is turned on, this program is read out from the internal data storage memory 35 into the main memory 32, and executed by the CPU 311. In the present embodiment, as an example, the information processing program is previously stored in the internal data storage memory 35, but may be downloaded to the game apparatus 10 via the Internet or the like. Alternatively, the information processing program may be read out from programs stored in the external memory 45 or the external data storage memory 46 for execution.

First, when the power (the power button 14F) of the game apparatus 10 is turned on, a boot program (not shown) is executed by the CPU 311, whereby a launcher program, which is a program for selectively executing a plurality of application programs and is stored in the internal data storage memory 35, is loaded into the main memory 32 and executed by the CPU 311. Then, an information processing application is selected and executed on the launcher program, whereby the information processing program is loaded into the main memory 32. Then, the loaded information processing program is executed by the CPU 311.

In FIG. 11A, the CPU 311 performs the initialization process for initializing data needed for executing the game program (step 101). With reference to FIG. 12, the following will describe in detail the initialization process performed at step 101.

In FIG. 12, the CPU 311 initializes the face detection data Db (step 201). Specifically, the CPU 311 initializes the eye interval Ko, the face inclination Kk, the face position Ki, which are indicated by the face detection data Db as described above, such that the eye interval Ko, the face inclination Kk, the face position Ki are set to zero.

When the initialization of the face detection data Db is completed, the CPU 311 initializes the face collation data Dc (step 202). Specifically, the CPU 311 initializes the face collation data Dc such that the data indicating the characteristic point of the face indicated by the face collation data Dc is set to be, for example, data indicating nothing, such as Null.

When the initialization of the face collation data Dc is completed, the CPU 311 initializes the authentication result data De (step 203). Specifically, the CPU 311 initializes the face collation data Dc such that the ID indicated by the authentication result data De is set to be, for example, data indicating nothing, such as Null.

When the initialization of the authentication result data De is completed, the CPU 311 ends the processing of the subroutine of the initialization process.

Referring back to FIG. 11A, after the process at step 101, the CPU 311 reads out, from the external data storage memory 46, data needed for processing of the game program, and stores the data in the main memory 32 (step 102). Specifically, first, the CPU 311 reads out the meeting frequency data Df from the external data storage memory 46, and stores the meeting frequency data Df in the main memory 32. When reading the meeting frequency data Df, the CPU 311 reads out, from the external data storage memory 46, each piece of the personal authentication data to which an unique ID is assigned, and stores the face authentication data Dd composed of the read personal authentication data, in the main memory 32. When storing the face authentication data Dd in the main memory 32, the CPU 311 selects and reads out pieces of animal object data which indicate animals indicated by the read meeting frequency data Df, from among each piece of the animal object data stored in the external data storage memory 46, and stores the object data Dg composed of the read animal object data, in the main memory 32. When storing the object data Dg, the CPU 311 reads out various pieces of the motion pattern data stored in the external data storage memory 46, and stores the pattern data Dl composed of the read motion pattern data, in the main memory 32. When storing the pattern data Dl in the main memory 32, the CPU 311 reads out the trigger determination audio data Di stored in the external data storage memory 46, and stores the trigger determination audio data Di in the main memory 32. When reading the trigger determination audio data Di, the CPU 311 reads out, from the external data storage memory 46, the sound determination data which is used for determining the content of a sound inputted as an object operation input, and stores the sound determination aggregate data Dj composed of the read sound determination data, in the main memory 32.

When storing the sound determination aggregate data Dj in the main memory 32, the CPU 311 displays, on the upper LCD 22, an animal object which is indicated by each piece of the animal object data constituting the object data Dg stored in the main memory 32, as described above (step 103). Note that the animal object data read out at step 103 is animal object data indicating the animals indicated by the meeting frequency data Df, other than animals which are in a state of not being directly taken care of by the user.

When displaying the animals on the upper LCD 22, the CPU 311 instructs the inner imaging section 24 to take a taken image Kg, and stores, in the main memory 32, taken image data Da which indicates the taken image Kg and which is outputted from the inner imaging section 24 in accordance with this instruction (step 104). When storing the taken image data Da in the main memory 32, the CPU 311 analyzes the taken image Kg indicated by the taken image data Da stored in the main memory 32, and determines whether or not a face is included in the taken image Kg (step 105). When determining that the face is included (Yes at step 105), the CPU 311 extracts a characteristic point of the face included in the taken image Kg, and generates face collation data Dc indicating the extracted characteristic point (step 106).

When generating the face collation data Dc, the CPU 311 performs the face authentication process for identifying the user by using the generated face collation data Dc (step 107). With reference to FIG. 13, the following will describe in detail the face authentication process performed at step 107.

In FIG. 13, first, the CPU 311 determines whether or not the personal authentication data constituting the face authentication data Dd stored in the main memory 32 has been registered (step 301). Specifically, the CPU 311 determines whether or not the number of pieces of the personal authentication data constituting the face authentication data Dd is equal to or more than one. When the number of pieces of the personal authentication data constituting the face authentication data Dd is equal to or more than one, the CPU 311 determines that the personal authentication data has been registered. On the other hand, when the number of pieces of the personal authentication data constituting the face authentication data Dd is not equal to or more than one, the CPU 311 determines that the personal authentication data has not been registered.

When determining that the personal authentication data has been registered (Yes at step 301), the CPU 311 compares the characteristic point indicated by the face collation data Dc to the characteristic point indicated by each piece of the personal authentication data constituting the face authentication data Dd, and calculates a similarity degree Rd for each piece of the personal authentication data. When calculating the similarity degrees Rd, the CPU 311 selects the ID assigned to the personal authentication data having the highest similarity degree Rd among the calculated similarity degrees Rd (step 302). Next, the CPU 311 determines whether or not the similarity degree Rd of the selected ID is equal to or more than the predetermined first similarity degree threshold th1 (step 303). When determining that the similarity degree Rd of the selected ID is equal to or more than the predetermined first similarity degree threshold th1 (Yes at step 303), the CPU 311 determines that the current user is identified as the user of the selected ID, and updates the authentication result data De stored in the main memory 32, with authentication result data De indicating the selected ID (step 304).

On the other hand, when determining that the personal authentication data has not been registered (No at step 301) or when determining that the similarity degree Rd of the selected ID is not equal to or more than the first similarity degree threshold th1 (No at step 303), the CPU 311 updates the authentication result data De stored in the main memory 32, with authentication result data De indicating Null (step 305).

When the update of the authentication result data De is completed, the CPU 311 ends the processing of the subroutine of the face authentication process.

Referring back to FIG. 11A, after the process at step 107, the CPU 311 performs the registration process using the updated authentication result data De (step 108). With reference to FIG. 14, the following will describe in detail the registration process performed at step 108.

In FIG. 14, first, the CPU 311 determines whether or not the user is identified in the face authentication process (step 401). Specifically, the CPU 311 determines whether or not Null is indicated by the authentication result data De stored in the main memory 32. When. Null is not indicated by the authentication result data De, the CPU 311 determines that the user is identified (Yes at step 401). On the other hand, when Null is indicated by the authentication result data De, the CPU 311 determines that the user is not identified (No at step 401).

When determining that the user is not identified (No at step 401), the CPU 311 determines whether or not it is possible to newly register personal authentication data (step 402), in order that the user can be identified later. Specifically, the CPU 311 refers to the face authentication data Dd stored in the main memory 32 to recognize the registration number Ts of the personal authentication data, and determines whether or not the recognized registration number Ts is equal to the registerable number Tks. When the registration number Ts is not equal to the registerable number Tks, the CPU 311 determines that it is possible to newly register personal authentication data (Yes at step 402). On the other hand, when the registration number Ts is equal to the registerable number Tks, the CPU 311 determines that it is not possible to newly register personal authentication data (No at step 402).

When determining that it is not possible to newly register personal authentication data (No at step 402), the CPU 311 refers to the meeting frequency data Df, and determines whether or not there is any user which has not met any animal for the deletion determination period Sk or longer (step 403). Specifically, the CPU 311 refers to the meeting frequency data Df stored in the main memory 32, and identifies the ID of any user corresponding to last update date and time whose time interval to the current time is equal to or more than the deletion determination period Sk. When identifying the ID of any user corresponding to the last update date and time whose time interval to the current time is equal to or more than the deletion determination period Sk, the CPU 311 determines that there is any user which has not met any animal for the deletion determination period Sk or longer (Yes at step 403). On the other hand, when not identifying the ID of any user corresponding to the last update date and time whose time interval to the current time is equal to or more than the deletion determination period Sk, the CPU 311 determines that there is no user which has not met any animal for the deletion determination period Sk or longer (No at step 403).

When determining that there is any user which has not met any animal for the deletion determination period Sk or longer (Yes at step 403), the CPU 311 refers to the meeting frequency Td of each user which has not met any animal for the deletion determination period Sk or longer (step 404). Then, the CPU 311 determines the user corresponding to the lowest meeting frequency Td among the referred meeting frequencies Td, and deletes all data concerning the determined user (step 405).

On the other hand, when determining that there is no user which has not met any animal for the deletion determination period Sk or longer (No at step 403), the CPU 311 refers to the meeting frequency data Df stored in the main memory 32, determines the user corresponding to the lowest meeting frequency Td, and deletes all data concerning the determined user (step 406).

Note that the data deleted at step 405 or 406 is all data concerning the determined user in the meeting frequency data Df and all data concerning the determined user in the face authentication data Dd.

When deleting the data at step 405 or 406, the CPU 311 generates, as personal authentication data, data indicating the characteristic point indicated by the face collation data Dc stored in the main memory 32, assigns a unique ID to this personal authentication data, and newly registers this personal authentication data as a piece of the personal authentication data constituting the face authentication data Dd (step 407).

When registering the new personal authentication data, the CPU 311 updates the authentication result data De stored in the main memory 32, with data indicating the ID assigned to the registered personal authentication data (step 408).

On the other hand, when determining that the user is identified in the face authentication process (Yes at 401), the CPU 311 determines whether or not the meeting frequency Td of the identified user has been updated within the update period Rk (step 409). Specifically, the CPU 311 refers to the meeting frequency data Df stored in the main memory 32, and determines whether or not the period from the last update date and time corresponding to the ID indicated by the authentication result data De, to the current time is equal to or longer than the update period Rk. When the period from the last update date and time corresponding to the ID indicated by the authentication result data De, to the current time is not equal to or longer than the update period Rk, the CPU 311 determines that the meeting frequency Td of the identified user has been updated within the update period Rk (Yes at step 409). On the other hand, when the period from the last update date and time corresponding to the ID indicated by the authentication result data De, to the current time is equal to or longer than the update period Rk, the CPU 311 determines that the meeting frequency Td of the identified user has not been updated within the update period Rk (No at step 409).

When determining that the meeting frequency Td of the identified user has not been updated within the update period Rk (No at step 409), the CPU 311 increases, by one, each meeting frequency Td, in the meeting frequency data Df stored in the main memory 32, corresponding to the ID of the user, and updates each meeting frequency Td (step 410). However, the CPU 311 does not update the meeting frequency Td, in the meeting frequency data Df, corresponding to an animal which is in a state of not being directly taken care of by the user. When updating the meeting frequency Td of the identified user, the CPU 311 updates the last update date and time corresponding to the ID of the user, with the current date and time in the meeting frequency data Df (step 411).

When determining that the meeting frequency Td of the identified user has been updated within the update period Rk (Yes at step 409) or when updating the last update date and time (step 411), the CPU 311 determines whether or not to update the personal authentication data of the identified user (step 412). Specifically, the CPU 311 determines whether or not the similarity degree Rd calculated at step 302 for the personal authentication data corresponding to the ID of the identified user is equal to or more than the second similarity degree threshold th2 (step 412). When the similarity degree Rd is equal to or more than the second similarity degree threshold th2, the CPU 311 determines to update the personal authentication data of the identified user (Yes at step 412). On the other hand, when the similarity degree Rd is not equal to or more than the second similarity degree threshold th2, the CPU 311 determines not to update the personal authentication data of the identified user (No at step 412).

When determining to update the personal authentication data of the identified user (Yes at step 412), the CPU 311 updates the personal authentication data of the user in the face authentication data Dd so as to indicate the characteristic point indicated by the face collation data Dc stored in the main memory 32 (step 413).

When updating the authentication result data De so as to indicate the ID assigned to the newly registered personal authentication data (step 408), when updating the personal authentication data (step 413), or when determining not to update the personal authentication data of the identified user (No at step 412), the CPU 311 ends the processing of the subroutine of the registration process.

Referring back to FIG. 11A, when determining that the face is not included (No at step 105), the CPU 311 updates the authentication result data De with Null (step 109). Then, When updating the authentication result data De with Null or when ending the registration process, the CPU 311 determines, in FIG. 11B, whether or not an operation for calling an animal has been inputted by the user as described above (step 110). Specifically, the CPU 311 determines whether or not audio data generated when the user inputs a sound substantially agrees with the trigger determination audio data Di stored in the main memory 32 as described above. When the audio data generated when the user inputs the sound substantially agrees with the trigger determination audio data Di, the CPU 311 determines that the sound for calling an animal has been inputted by the user (Yes at step 110). In addition, when determining that a track of a motion for calling an animal has been drawn before determining that the sound for calling an animal has been inputted, the CPU 311 determines that the operation for calling an animal has been inputted by the user (Yes at step 110). On the other hand, when the audio data generated when the user inputs the sound does not substantially agree with the trigger determination audio data Di, the CPU 311 determines that the operation for calling an animal has not been inputted by the user (No at step 110). In addition, when determining that the track of the motion for calling an animal has not been drawn, the CPU 311 determines that the operation for calling an animal has not been inputted by the user (No at step 110).

When determining that the operation for calling an animal has been inputted by the user (Yes at step 110), the CPU 311 performs the motion control process of setting and controlling a motion which is performed when each animal displayed on the upper LCD 22 approaches the user in response to calling (step 111). With reference to FIG. 15, the following will describe in detail the motion control process performed at step 111.

In FIG. 15, first, the CPU 311 determines whether or not the user is identified (step 501). Specifically, the CPU 311 determines whether or not Null is indicated by the authentication result data De. When Null is not indicated by the authentication result data De, the CPU 311 determines that the user is identified (Yes at step 501), and initializes a variable N used for the motion control process, to be one (step 502). When initializing the variable N to be one, the CPU 311 refers to the meeting frequency data Df stored in the main memory 32, and refers to the meeting frequency Td with the Nth animal (Nth animal from the above in the example shown in FIG. 6), among the meeting frequencies Td corresponding to the ID indicated by the authentication result data De (step 503). The CPU 311 determines whether or not the meeting frequency Td which is referred to at step 503 is equal to or more than the first meeting frequency threshold thm1 (step 504).

When determining that the meeting frequency Td which is referred to at step 503 is equal to or more than the first meeting frequency threshold thm1 (Yes at step 504), the CPU 311 determines that the Nth animal is well attached to the user, and sets a motion of joyfully approaching the user, for the Nth animal (step 505). On the other hand, when determining that the meeting frequency Td which is referred to at step 503 is not equal to or more than the first meeting frequency threshold thm1 (No at step 504), the CPU 311 determines whether or not the meeting frequency Td is equal to or more than the second meeting frequency threshold thm2 (step 506). When determining that the meeting frequency Td is equal to or more than the second meeting frequency threshold thm2 (Yes at step 506), the CPU 311 determines that the Nth animal is not well attached to the user, and sets a motion of merely approaching the user, for the Nth animal (step 507). On the other hand, when determining that the meeting frequency Td is not equal to or more than the second meeting frequency threshold thm2 (No at step 506), the CPU 311 determines that the Nth animal is on alert against the user, and sets a motion of approaching the user on alert, for the Nth animal (step 508).

When setting the motion for the Nth animal at step 505, 507, or 508, the CPU 311 determines whether or not there is any animal for which a motion has not been set, among the animals displayed on the upper LCD 22 (step 509). Specifically, the CPU 311 determines whether the current variable N is equal to or more than the number Nmax of all the animals indicated by the meeting frequency data Df. When the variable N is equal to or more than the number Nmax of all the animals, the CPU 311 determines that there is no animal for which a motion has not been set (Yes at step 509). On the other hand, when the variable N is not equal to or more than the number Nmax of all the animals, the CPU 311 determines that there is any animal for which a motion has not been set (No at step 509).

When determining that there is any animal for which a motion has not been set (No at step 509), the CPU 311 increments the variable N by one (step 512), and repeats the processing from step 503.

On the other hand, when determining that there is no animal for which a motion has not been set (Yes at step 509), the CPU 311 refers to the motion pattern indicating each motion and starts control of the animal object representing each animal, such that each animal displayed on the upper LCD 22 approaches the user with the set motions (step 510). On the other hand, when Null is indicated by the authentication result data De and the CPU 311 determines that the user is not identified (No at step 501), the CPU 311 sets a motion of merely approaching the user for each of all the animal objects displayed on the upper LCD 22 (step 513). When setting the motion of merely approaching the user for each of all the animal objects as well, the CPU 311 starts control of the animal object representing each animal (step 510).

When starting control of the animal object representing each animal, the CPU 311 determines whether or not the control of each animal object has been completed (step 511). Specifically, the CPU 311 determines whether or not each animal object whose motion is controlled has come to a screen change position in the virtual space as described above. When determining that each animal object whose motion is controlled has come to the screen change position, the CPU 311 determines that the control of each animal object has been completed (Yes at step 511). On the other hand, when determining that each animal object whose motion is controlled has not come to the screen change position, the CPU 311 determines that the control of each animal object has not been completed (No at step 511).

When determining that the control of each animal object has not been completed (No at step 511), the CPU 311 continues the control of each animal object while repeating the determination at step 511. On the other hand, when determining that the control of each animal object has been completed (Yes at step 511), the CPU 311 ends the subroutine of the motion control process.

Referring back to FIG. 11B, after the motion control process at step 111, the CPU 311 updates the motion controlled flag data Dh stored in the main memory 32, to be ON so as to indicate that the control of each animal object has been completed (step 112). When determining that the operation for calling an animal has not been inputted by the user (No at step 110) or when updating the motion controlled flag data Dh to be ON, the CPU 311 refers to the motion controlled flag data Dh stored in the main memory 32, and determines whether or not the motion controlled flag data Dh is ON (step 113). When determining that the motion controlled flag data Dh is ON (Yes at step 113), the CPU 311 instructs the inner imaging section 24 to take a taken image Kg, and updates the taken image data Da stored in the main memory 32, so as to indicate the taken image Kg outputted from the inner imaging section 24 in accordance with this instruction (step 114). Next, the CPU 311 refers to the updated taken image data Da, analyzes the taken image Kg indicated by the referred taken image data Da, and determines whether or not a face is included in the taken image Kg (step 115).

When determining that the face is included (Yes at step 115), the CPU 311 updates the face detection data Db (step 116). Specifically, the CPU 311 further analyzes the taken image Kg to recognize parameters, such as the eye interval Ko, the face inclination Kk, and the face position Ki, which are detected from the taken image Kg, and updates the face detection data Db stored in the main memory 32, so as to indicate the recognized parameters.

When updating the face detection data Db, the CPU 311 determining whether or not an object operation input has been detected as described above (step 117). When determining that the object operation input has not been detected (No at step 117), the CPU 311 performs the detection motion control process of controlling each animal displayed on the upper LCD 22, on the basis of the face detection data Db which is updated at step 116 (step 118).

With reference to FIG. 16, the following will describe in detail the detection motion control process performed at step 118. In FIG. 16, first, the CPU 311 refers to the face detection data Db stored in the main memory 32 (step 601). Next, the CPU 311 determines whether or not the eye interval Ko indicated by the face detection data Db which is referred to at step 601 is equal to or more than the interval threshold tho (step 602). When determining that the eye interval Ko is equal to or more than the interval threshold tho (Yes at step 602), the CPU 311 sets a motion of each animal object representing each animal displayed on the upper LCD 22, such that each animal is displayed so as to behave as if licking the face of the user (step 603).

On the other hand, when determining that the eye interval Ko indicated by the face detection data Db which is referred to at step 601 is not equal to or more than the interval threshold tho (No at step 602), the CPU 311 determines whether or not the face inclination Kk indicated by the face detection data Db is equal to or more than the inclination threshold thk (step 604). When determining that the face inclination Kk is equal to or more than the inclination threshold thk (Yes at step 604), the CPU 311 sets a motion of each animal object representing each animal displayed on the upper LCD 22, such that each animal is displayed so as to incline its face similarly to the inclined face of the user (step 605).

On the other hand, when determining that the face inclination Kk indicated by the face detection data Db which is referred to at step 601 is not equal to or more than the inclination threshold thk (No at step 604), the CPU 311 sets a motion of each animal object representing each animal displayed on the upper LCD 22, such that each animal is displayed so as to turn its face toward the face of the user currently using the game apparatus 10 (step 606).

When setting the motion of each animal object at step 603, 605, or 606, the CPU 311 starts control of each animal object such that each animal performs the set motion, while referring to the motion pattern indicating each motion, as described above (step 607). When starting the control of each animal object representing each animal, the CPU 311 determines whether or not the control of each animal object has been completed (step 608). Specifically, the CPU 311 determines whether or not an end timing of a temporal change indicated by the motion pattern corresponding to the motion which is set for each animal object has come as described above. When determining that the control of each animal object has not been completed (No at step 608), the CPU 311 continues the control of each animal object while repeating the determination at step 608. On the other hand, when determining that the control of each animal object has been completed (Yes at step 608), the CPU 311 ends the subroutine of the detection motion control process.

Referring back to FIG. 11B, when determining that the face is not included (No at step 115) or when determining that the object operation input has been detected (Yes at step 117), the CPU 311 performs the object operation process of controlling each animal object representing each animal displayed on the upper LCD 22, in accordance with the detected object operation input (step 119). With reference to FIG. 17, the following will describe in detail the object operation process performed at step 119.

In FIG. 17, first, the CPU 311 determines whether or not the object operation input detected at step 117 is a sound input performed by the user (step 701). When determining that the object operation input is the sound input performed by the user (Yes at step 701), the CPU 311 determines the content of the detected sound as described above (step 702). When determining the content of the sound, the CPU 311 sets a motion of each animal object displayed on the upper LCD 22, on the basis of the determined result (step 703).

On the other hand, when determining that the object operation input detected at step 117 is not the sound input performed by the user (No at step 701), the CPU 311 determines whether or not a touch input has been detected as the object operation input (step 704). When determining that the touch input has been detected (Yes at step 704), the CPU 311 further refers to the touch position data Dk (step 705). Then, on the basis of the touch position history indicated by the referred touch position data Dk, the CPU 311 sets a motion of each animal object in accordance with the content of the detected touch input as described above (step 706).

When setting the motion of each animal object at step 703 or 706, the CPU 311 starts control of each animal object representing each animal displayed on the upper LCD 22, such that each animal is displayed so as to perform the set motion, while referring to the motion pattern indicating each motion as described above (step 707). When starting the control of each animal object, the CPU 311 determines whether or not the control of each animal object has been completed (step 708). Specifically, the CPU 311 determines whether or not an end timing of a temporal change indicated by the motion pattern corresponding to the motion which is set for each animal object has come as described above. When determining that the control of each animal object has not been completed (No at step 708), the CPU 311 continues the control of each animal object while repeating the determination at step 708. On the other hand, when determining that the control of each animal object has been completed (Yes at step 708) or when determining that the touch input has not been detected (No at step 704), the CPU 311 ends the subroutine of the object operation process.

Referring back to FIG. 11B, after the detection motion control process at step 118 or after the object operation process at step 119, the CPU 311 determines whether or not to start control of a motion in which each animal object displayed on the upper LCD 22 moves away from the user to the original position before calling (step 120). Specifically, the CPU 311 determines to start the control of the returning motion, when a predetermined operation acceptance period Uk has elapsed from completion of the motion control process, without detecting an object operation input. In addition, the CPU 311 determines to start the control of the returning motion, when: an object operation input is detected after the completion of the motion control process; the object operation process at step 119 is performed; and then the operation acceptance period Uk has elapsed from completion of the object operation process at step 119. Moreover, when an object operation input is not detected after the completion of the motion control process, the CPU 311 determines to start the control of the returning motion, until the operation acceptance period Uk has elapsed after the detection motion control process at step 118 is performed.

On the other hand, when: an object operation input is detected before the operation acceptance period Uk has elapsed from the completion of the motion control process; and the CPU 311 performs the object operation process, the CPU 311 determines not to start the control of the returning motion, until the operation acceptance period Uk has elapsed again.

When determining not to start the control of the returning motion (No at step 120), the CPU 311 repeats the processing from step 114. On the other hand, when determining to start the control of the returning motion (Yes at step 120), the CPU 311 updates the motion controlled flag data Dh stored in the main memory 32, to be OFF (step 121). Then, the CPU 311 controls each animal object displayed on the upper LCD 22, such that each animal object performs the motion of returning from the current position to the original position before calling (step 122). Specifically, the CPU 311 sets the motion of returning from the current position, and starts control of each animal object while referring to a motion pattern corresponding to the set motion. The CPU 311 completes the control of the returning motion, when each animal object returns to the original position before calling, while the control of each object is continued.

When the control of the returning motion is completed, the CPU 311 determines whether or not to end the game program (step 123). Specifically, when the power button 14F of the game apparatus 10 is pressed, the CPU 311 determines to end the game program (Yes at step 123). On the other hand, when the power button 14F of the game apparatus 10 is not pressed, the CPU 311 determines not to end the game program (No at step 123). When determining not to end the game program (No at step 123), the CPU 311 repeats the processing from step 104.

This is the description of the example of the game program according to the present embodiment. As is obvious from the above description, according to the game program, in the motion control process, a motion of each animal object can be set in accordance with the identified user. In the above description, the case where, when an operation which is a trigger for the motion control process is inputted by the user, a motion of each animal object can be set in accordance with the identified user, has been described as an example. However, in another embodiment, any other operation input on the game apparatus 10, such as an input of pressing a predetermined button, may be previously determined as an input which is a trigger for the motion control process. As a specific example, it is considered that an operation input of pressing a predetermined button is previously determined as the above input which is the trigger for the motion control process.

When an operation input of pressing a predetermined button is defined as the above input which is the trigger for the motion control process, it may be determined whether or not the button has been pressed, instead of determining whether or not a sound for calling has been inputted by the user as described above.

As described above, according to the game program, a motion of each animal object which is performed when a predetermined operation input is performed on the game apparatus 10 can be changed in accordance with the user which has performed the operation input. Thus, highly entertaining control of each animal object can be performed.

Further, in the above description, as an example, a motion of each animal object is set on the basis of the meeting frequency Td of the user with each animal. The meeting frequency Td is a value indicating a frequency at which the user contacts each animal in a pseudo manner. As described as an example above, in the motion control process, each animal object corresponding to the user having a relatively high meeting frequency Td is well attached to the user, and a motion of joyfully approaching the user is set as a motion of the animal object. On the other hand, as described as an example above, in the motion control process, each animal object corresponding to the user having a relatively low meeting frequency Td is not well attached to the user, and a motion of approaching the user on alert is set as a motion of the animal object. By setting the motion of each animal object on the basis of the meeting frequency Td in this manner, a motion corresponding to the frequency of contacting the user in a pseudo manner can be set for each animal object, and a response which is made when the user performs an operation input, for example, when the user inputs a sound for calling, can have an entertaining feature.

Further, in the above description, as an example, when the user cannot be identified, data indicating the characteristic point of the face of the unidentified user is registered as new personal authentication data. Then, in the above description, as an example, the initial value of the meeting frequency Td when the new personal authentication data is registered is a value which is less than the first meeting frequency threshold thm1 and equal to or more than the second meeting frequency threshold thm2. Thus, when a new user calls each animal object, a motion of merely approaching the user can be set for each animal object. However, in another embodiment, when a new user calls each animal object, any other motion such as a motion of approaching the user on alert may be set for each animal object. As a specific example, in the case where a motion of approaching the user on alert is set for each animal object when a new user calls each animal object, it is only necessary to previously determine a value less than the second meeting frequency threshold thm2, as the initial value of the meeting frequency Td. By setting an optional value as the initial value of the meeting frequency Td in the other embodiment as described above, an optional motion to a new user can be set.

Further, in the above description, as an example of a motion which is settable for each animal object in the motion control process, a motion of joyfully approaching the user is set for each animal corresponding to the meeting frequency Td which is equal to or more than the first meeting frequency threshold thm1. However, a motion which is set for each animal corresponding to the meeting frequency Td which is equal to or more than the first meeting frequency threshold thm1 may be any other motion, as long as the motion is set as a first motion. In addition, in the above description, as another example of a motion which is settable for each animal object in the motion control process, a motion of merely approaching the user is set for each animal corresponding to the meeting frequency Td which is less than the first meeting frequency threshold thm1 and equal to or more than the second meeting frequency threshold thm2. However, a motion which is set for each animal corresponding to the meeting frequency Td which is less than the first meeting frequency threshold thm1 and equal to or more than the second meeting frequency threshold thm2 may be any other motion, as long as the motion is set as a second motion. Moreover, in the above description, as another example of a motion which is settable for each animal object in the motion control process, a motion of approaching the user on alert is set for each animal corresponding to the meeting frequency Td less than the second meeting frequency threshold thm2. However, a motion which is set for each animal corresponding to the meeting frequency Td less than the second meeting frequency threshold thm2 may be any other motion, as long as the motion is set as a third motion.

Further, in the above description, any one of three motions, that is, any one of the first to third motions, is set for each animal object by using the two meeting frequency thresholds which are the first meeting frequency threshold thm1 and the second meeting frequency threshold thm2. However, in another embodiment, any one of four or more motions may be set for each animal object by using three or more meeting frequency thresholds which are different from each other.

Further, in the above description, as an example, when a sound which is a trigger is inputted after the ID of the user identified in the face authentication process is stored as the authentication result data De or after the ID of the unidentified user is newly registered in the registration process and stored as the authentication result data De, the motion control process using the authentication result data De is performed. By storing the authentication result of the user in the face authentication process as described above, the authentication result can be used at any timing, without consecutively performing the face authentication process and use of the authentication result obtained by the face authentication process. Thus, the processing load on the CPU 311 can be reduced. Note that, when it is unnecessary to reduce the processing load on the CPU 311, the face authentication process and use of the authentication result obtained by the face authentication process may be performed consecutively or in parallel.

Further, in the above description, as an example, in the detection motion control process, each animal object is controlled in accordance with the parameters of the face of the user currently using the game apparatus 10, such as the eye interval Ko, the face inclination Kk, and the face position Ki. Thus, as described above, each animal object can be controlled in accordance with a movement of the face of the user such as moving the face close to the game apparatus 10, inclining the face, and moving the position of the face relative to the game apparatus 10, and highly entertaining control of each animal object can be performed.

Further, in the above description, as an example, in the detection motion control process, a motion of each animal object is set and controlled on the basis of only the parameters of the face such as the eye interval Ko, the face inclination Kk, and the face position Ki. However, in another embodiment, in the detection motion control process, a motion of each animal object may be set and controlled by using both: each meeting frequency Td corresponding to the ID of the identified user; and the parameters of the face. As a specific example, a motion of turning the face away from the user, moving away from the user, or the like may be set and controlled, when the user of the ID corresponding to the relatively low meeting frequency Td moves their face close to the game apparatus 10 such that the eye interval Ko becomes equal to or more than the interval threshold tho. On the other hand, as another specific example, a motion of joyfully licking the user's face, quickly swinging the tail, or the like may be set and controlled, when the user of the ID corresponding to the relatively high meeting frequency Td moves their face close to the game apparatus 10 such that the eye interval Ko becomes equal to or more than the interval threshold tho.

Further, in the above description, as an example, the detection result of the parameters of the face is stored as the face detection data Db. Then, when an object operation input is not detected, the detection motion control process using the face detection data Db is performed. By storing the detection result of the parameters of the face as described above, only when an object operation input is detected, the detection result of the parameters of the face can be used, without consecutively performing the detection of the parameters of the face and the detection motion control process using the detection result of the parameters of the face. Thus, the processing load on the CPU 311 can be reduced. Note that, when it is unnecessary to reduce the processing load on the CPU 311, the detection of the parameters of the face and use of the detection result of the parameters of the face may be performed consecutively or in parallel.

Further, in the above description, the eye interval Ko is used as an index indicating the size of a face. However, in another embodiment, a proportion of skin color pixels in the taken image Kg may be used as an index indicating the size of a face.

Further, in the above description, as an example, the meeting frequency Td is updated when a period which has elapsed from the last update date and time is equal to or longer than the update period Rk. Thus, the meeting frequency Td is updated each time the user is identified, and can be prevented from being excessively high. Even when a program which repeats only the face authentication process and the registration process in cycles of a time unit (e.g., 1/60 sec) in which the game apparatus 10 performs processing is executed in the game apparatus 10 as a specific example of the information processing program according to the present embodiment, the meeting frequency Td can be prevented from being updated in cycles of the time unit, and also can be prevented from being excessively high. In addition, in the above description, a length of six hours are set as an example of the length of the update period Rk. However, the length of the update period. Rk may be any other length.

Further, in the above description, as an example, the last update date and time corresponds to one user. However, in another embodiment, the last update date and time may correspond to each of the meeting frequencies Td of one or more users with one or more animal objects, and may be updated as appropriate.

Further, in the above description, as an example, each of the meeting frequencies Td of one or more users correspond to each of one or more animal objects by using the meeting frequency data Df. In addition, in the game program, when the meeting frequency Td is updated, the meeting frequency Td is updated for each animal object. Thus, as described as an example above, even when two or more animal objects are displayed on the upper LCD 22, motions corresponding to the identified user can be simultaneously set and controlled for the displayed animal objects, respectively.

Further, in the above description, as an example, the meeting frequency Td corresponding to an animal which is set to be in a state of not being directly taken care of by the user in the meeting frequency data Df is not updated. Thus, only the meeting frequencies Td with animals which actually contact the user in a pseudo manner can be increased and updated, a frequency of actual contact of the user with each animal can be reflected in the meeting frequency Td. In addition, by not updating the meeting frequency Td corresponding to the animal which is set to be in a state of not being directly taken care of by the user in the meeting frequency data Df, a motion of only the animal in this state can be controlled to be different from motions of other animal objects, thereby providing diversity. Moreover, in the above description, as an example, the animal of which the meeting frequency Td is to be updated is the animal which is set to be in a state of being directly taken care of the user in the meeting frequency data Df. However, in another embodiment, only the meeting frequency Td corresponding to each animal object rendered on the upper LCD 22 may be updated.

Further, in the above description, as an example, when the user is not identified, data indicating the characteristic point of the face of the unidentified user is registered as new personal authentication data. Thus, a user which uses, for the first time, the game apparatus 10 which executes the game program also can enjoy pseudo contact with animals similarly to the users of which the personal authentication data has already been registered.

Further, in the above description, as an example, when new personal authentication data is registered, if the registration number Ts is equal to the registerable number Tks, data of a user which is selected from the already registered users is deleted. In addition, in the above description, as an example, the to-be-deleted data of the user is data, in the face authentication data Dd and the meeting frequency data Df, corresponding to the ID of the user. Specifically, in the above description, the to-be-deleted data of the user is data of the user of the ID corresponding to the lowest meeting frequency Td among the meeting frequencies Td each of which corresponds to the user of the ID and has last update date and time from which a time period equal to or longer than the deletion determination period Sk has elapsed. Thus, data concerning a user, which has not used, for a relatively long time period, the game apparatus 10 executing the game program, has a low frequency of contact with animals, and is thought to have lost interest in animals, can be deleted. Moreover, in the above description, as an example, when there is no user of the ID having last update date and time from which a time period equal to or longer than the deletion determination period Sk has elapsed, the data of the user of the ID corresponding to the lowest meeting frequency Td indicated by the meeting frequency data Df is selected and deleted. Thus, when there is no user of the ID having last update date and time from which a time period equal to or longer than the deletion determination period Sk has elapsed, data concerning a user, which has the lowest frequency of contact with animals and is thought to have lost interest in animals, can be determined and deleted. Note that, when selecting to-be-deleted data concerning a user, data concerning a user having the lowest sum of the corresponding meeting frequencies Td; data concerning a user having the lowest average of the corresponding meeting frequencies Td; or the like may be selected. In addition, an ID assigned to personal authentication data of a new user may be any ID as long as it is a unique ID as described above. However, as an example, the ID which is deleted immediately before may be assigned thereto.

Further, in the above description, as an example, when the similarity degree Rd is equal to or more than the second similarity degree threshold th2 and the faces closely resemble each other, the characteristic point of the face indicated by the personal authentication data of the user is updated with the characteristic point of the face indicated by the face collation data Dc when the user is identified. In other words, in the above description, when the characteristic point of the face of the identified user closely resembles the characteristic point already stored as the personal authentication data, the characteristic point of the face indicated by the personal authentication data of the user is updated with the characteristic point of the face of the identified user, namely, the characteristic point of the face of the current user. Thus, the characteristic point of the face of the user indicated by the personal authentication data can be maintained to be the latest characteristic point of the face of the user.

Further, in the above description, as an example, when the characteristic point of the face of the identified user closely resembles the characteristic point already stored as the personal authentication data, the characteristic point of the face indicated by the personal authentication data of the user is updated with the characteristic point of the face of the identified user, namely, the characteristic point of the face of the current user. However, in another embodiment, even if the characteristic point of the face of the identified user does not closely resemble the characteristic point already stored as the personal authentication data, the already stored characteristic point may be updated with the characteristic point of the current face of the identified user, when the user is identified.

Further, in the above description, as an example, even when a face is not detected from a taken image Kg which is taken immediately prior to the face authentication process, and the user is not identified, if a face is detected from a taken image Kg which is taken immediately prior to the detection motion control process, a motion of each animal object is controlled in the detection motion control process. Thus, even when the user is not identified, a motion based on the face parameters can be set for each animal object and controlled in the detection motion control process, thereby providing pseudo contact with the animals in the detection motion control process.

Further, the registerable number Tks described above may be an optional number.

Further, in the above description, the taken image Kg is not displayed on any of the upper LCD 22 and the lower LCD 12. However, in another embodiment, the taken image Kg may be sequentially taken by the inner imaging section 24, and may be displayed on a part of a display area at any timing, such that the taken image Kg does not overlap the display area of each animal object. Thus, for example, in the detection motion control process described above, the user can contact each animal in a pseudo manner while predicting the parameters of their own face on the basis of the displayed taken image Kg.

Further, in the above description, the personal authentication data for the four users and the meeting frequency data Df indicating the meeting frequencies Td corresponding to these users are previously stored in the external data storage memory 46. However, for example, no personal authentication data and no meeting frequency data Df are stored in the external data storage memory 46 connected to the game apparatus 10 which executes the game program for the first time. Thus, when the game program is executed, the face authentication data Dd and the meeting frequency data Df cannot be read out from the external data storage memory 46 as described above. In such a case, when the game program is executed in the game apparatus 10, face authentication data Dd composed of personal authentication data of a user currently using the game apparatus 10 is generated and stored in the main memory 32. Next, a scene for purchasing an animal (e.g., a puppy or a kitten) is provided to the user, causing the user to purchase one or more animals. Thus, meeting frequency data Df indicating a meeting frequency Td of the user with each animal can be generated and stored in the main memory 32. An initial value of each meeting frequency Td which is set at this time may be the initial value as described above. Then, when the game program is ended, the face authentication data Dd and the meeting frequency data Df stored in the main memory 32 are stored in the external data storage memory 46. Thus, when the game program is executed in the game apparatus 10 next time, the face authentication data Dd and the meeting frequency data Df can be read out from the external data storage memory 46 as described above.

Further, in the above description, the meeting frequencies Td corresponding to each user are stored as the meeting frequency data Df, independently of the personal authentication data indicating the characteristic point of the face of each user. However, in another embodiment, the meeting frequency Td of each user with each object may be included in the personal authentication data.

The authentication result data De is an example of identification information recited in the appended claims.

Further, in the above description, the eye interval Ko, the face inclination Kk, and the face position Ki are detected as an example of the face parameters. Here, as is obvious from the above description, the eye interval Ko becomes large as the position of the face of the user gets close to the inner imaging section 24, and becomes small as the position of the face of the user moves away from the inner imaging section 24. In other words, the eye interval Ko is considered to be a parameter indicating the relative position of the face of the user relative to the inner imaging section 24. In addition, as is obvious from the above description, the face inclination Kk is considered to be a parameter indicating the orientation of the face of the user relative to the inner imaging section 24. Moreover, as is obvious from the above description, the face position Ki is considered to be a parameter indicating the relative position of the face relative to the inner imaging section 24. In other words, the aforementioned face parameters are considered to be an example of values indicating the relative position and the relative orientation of the face of the user relative to the inner imaging section 24.

Further, as an example of the information processing program according to the present embodiment, the game program for setting and controlling a motion of each animal object in accordance with the identified user has been described above. However, another example of the information processing program according to the present embodiment is a motion setting program for setting and controlling a motion of any other object, not the animal object.

When a motion of any other object, not the animal object, is set and controlled, personal authentication data indicating a characteristic point which is closest to the characteristic point of the face indicated by the face collation data Dc may be selected from the personal authentication data constituting the face authentication data Dd. In addition, when a motion of any other object, not the animal object, is set and controlled, a number of selection times which the personal authentication data is selected is preferably stored instead of the meeting frequency Td described as an example above. When the number of selection times is stored, selection times data indicating a number of times which the personal authentication data of each of one or more users is selected, such that the number of times for each user corresponds to each object which is a control target, is used instead of the meeting frequency data Df. Then, similarly as in the game program, instead of the meeting frequency Td, the number of selection times is compared to a threshold, and a motion of the object is set on the basis of the result of the comparison. By so doing, the motion of the object can be set and controlled in accordance with the user of the selected personal authentication data, and highly entertaining control of the object can be performed.

Note that, the number of selection times may be increased and updated, each time the personal authentication data of the user is selected, or when the elapsed time from the last update date and time is equal to or more than the update period Rk as described above. In addition, even when a motion of any object, not the animal object, is set and controlled, registration, deletion, and update of personal authentication data can be performed similarly to the processing in the game program.

Further, in the above description, the face collation data Dc indicating the characteristic point of the face, and the personal authentication data which indicates the characteristic point of the face and constitutes the face authentication data Dd, are used. In addition, in the above description, these characteristic points are used for calculating the similarity degree Rd. However, in another embodiment, face collation data Dc and personal authentication data each of which indicates a characteristic amount of the face, not the characteristic point of the face, may be used. In this case, for calculating the similarity degree Rd, a characteristic vector obtained by combining characteristic amounts indicated by each data is calculated for each data. Then, each characteristic vector is mapped in a lower-dimensional characteristic space by using an analysis method such as principal component analysis or linear discriminant analysis, such that the characteristic is not impaired. Then, a value obtained by normalizing a distance (Euclidean distance or Mahalanobis distance) between the mapped characteristic vectors of the data used for calculating the similarity degree Rd to 0 to 100, is calculated, and this value is a similarity degree Rd.

Further, in the above description, when an operation which is a trigger for the motion control process is inputted by the user, all the animals displayed on the upper LCD 22 approach the user. However, any number of animal objects may be controlled in accordance with an operation input (including a sound input). For example, when the user calls a name, only the corresponding animal approaches the user, and, when clapping or whistling is performed, all the animals approach the user.

Further, in the above description, in the motion control process, motions corresponding to the identified user are set for all the animal objects displayed on the upper LCD 22. However, in another embodiment, motions corresponding to the identified user may be set for only optional animal objects among the animal objects displayed on the upper LCD 22, and the optional animal objects may approach the user.

Further, in the above description, in the detection motion control process, motions corresponding to each parameter is set for all the animal objects displayed on the upper LCD 22. However, in another embodiment, motions corresponding to each parameter may be set for only optional animal objects among the animal objects displayed on the upper LCD 22.

Further, the case where a plurality of animal objects (three animal objects) are displayed on the upper LCD 22 has been described above as an example. However, it is understood that there could be the case where only one animal object is displayed on the upper LCD 22.

Figure 9A:
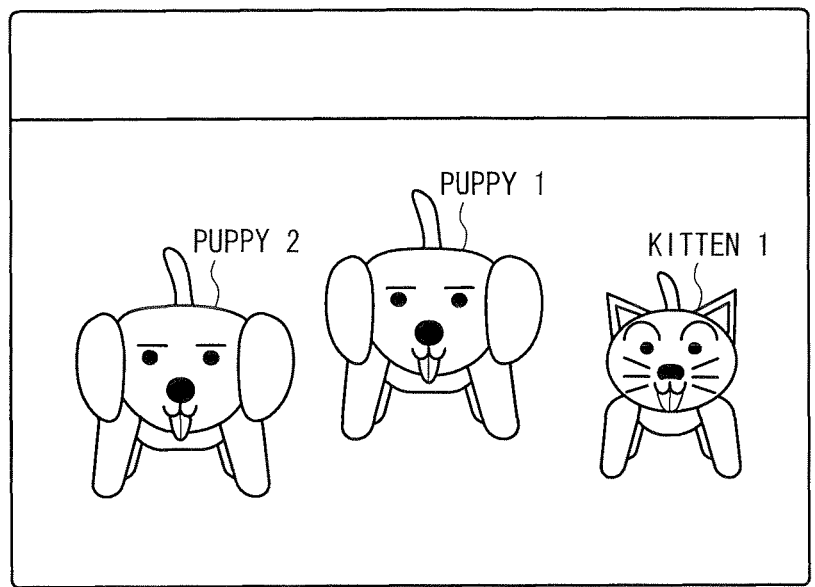
FIG. 9A is a diagram illustrating another example of the screen displayed in accordance with the information processing program being executed.
Figure 9A:
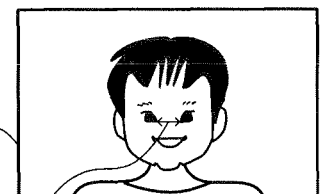
Figure 9B:
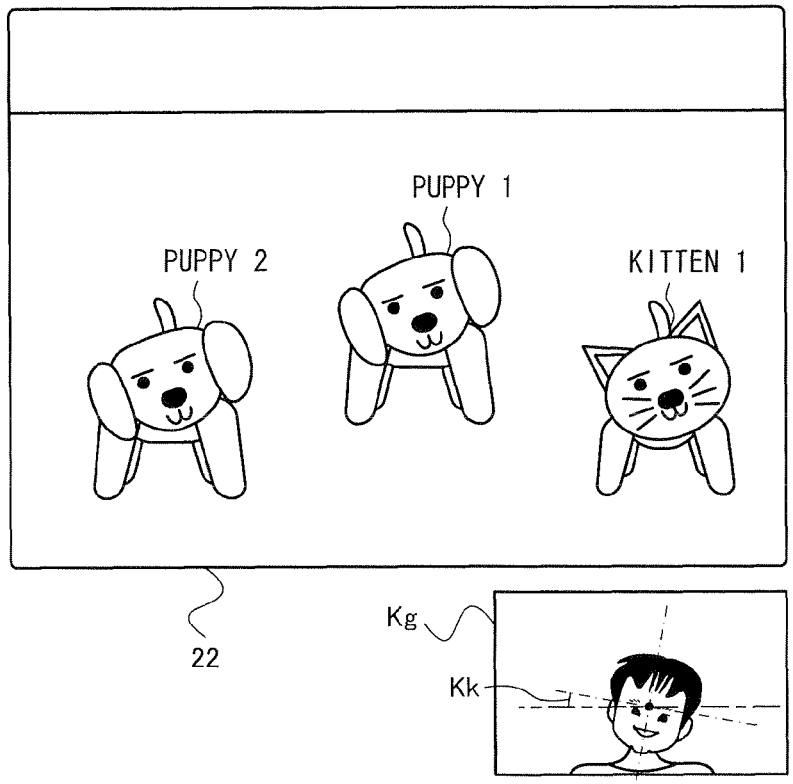
FIG. 9B is a diagram illustrating another example of the screen displayed in accordance with the information processing program being executed.
Figure 9C:
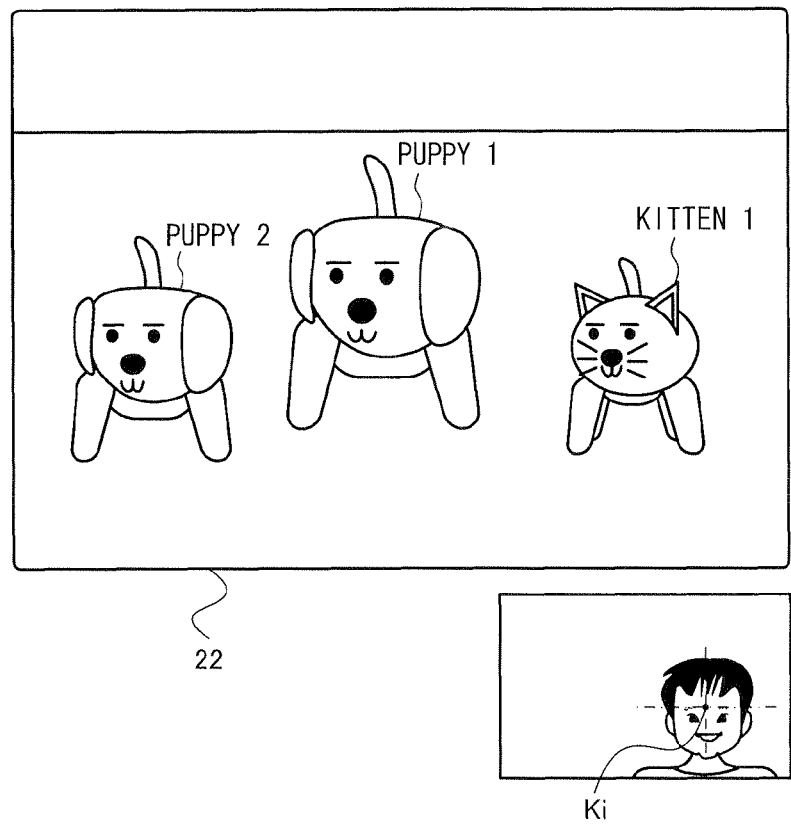
FIG. 9C is a diagram illustrating another example of the screen displayed in accordance with the information processing program being executed.

Further, FIG. 9A illustrates an example in which all animals behave as if licking the face of the user at that place. However, in another embodiment, among the animal objects displayed on the upper LCD 22, one or more optional animal objects (may be all the animal objects) behave as if licking the face of the user while putting their feet on the lower edge of the screen.

Further, in the above description, when a sound inputted as an operation which is a trigger for the motion control process is determined or when the content of a sound detected as an object operation input is determined, the determination is performed by comparison to the previously stored trigger determination audio data or sound determination audio data. However, in another embodiment, for example, when a sound other than a voice, such as a whistling sound and a clapping sound, is determined, the shape of the waveform of the sound may be analyzed and the determination may be performed on the basis of the obtained characteristic.

Further, in the above description, when the motion control process is ended, each approached animal object is displayed on the upper LCD 22. However, in another embodiment, the LCD on which each approached animal object is displayed may be changed from the upper LCD 22 to the lower LCD 12. Thus, the user can perform a touch input on the animal object itself, not on the silhouette described above, and an operation feel as if directly touching the animal object can be provided to the user.

Further, in the above description, the lower LCD 12 and the upper LCD 22 physically separated from each other are arranged one above the other (the case of two screens above and below) as an example of an LCD display section having two screens. However, the configuration of the display section having two screens may be another configuration. For example, the lower LCD 12 and the upper LCD 22 may be arranged on a main surface of the lower housing 11 laterally side by side. Alternatively, a vertically long LCD having the same width as that of the lower LCD 12 and a vertical length which is twice as large as that of the lower LCD 12 (namely, an LCD which is physically one unit and has a display size with a vertical length equal to a sum of vertical lengths of two screens) may be provided in the main surface of the lower housing 11, and two images may be displayed one above the other (displayed so as to be adjacent to each other without a boundary portion between above and below). Still alternatively, a horizontally long LCD having the same vertical length as that of the lower LCD 12 and a width which is twice as large as that of the lower LCD 12 may be provided in the main surface of the lower housing 11, and two game images may be displayed laterally side by side (displayed so as to be adjacent to each other without a boundary portion between left and right). In other words, a physically one screen may be divided into two and used to display two images. In either form of an image, if the touch panel 13 is provided on a screen on which the display image displayed on the lower LCD 12 is displayed, the present invention can be achieved similarly. Alternatively, in the case where the physically one screen is divided into two and used to display the two images, the touch panel 13 may be provided on the entirety of the screen. Further, in the above description, the animal objects are displayed only on the upper LCD 22, and a touch input on the silhouette displayed on the lower LCD 12 is accepted. However, in another embodiment, each animal object may be displayed on one LCD on which the touch panel 13 is entirely provided, and a touch input on the animal object, not on the silhouette, may be accepted. In this case, display by the motion control process, the detection motion control process, the object operation process, or the like, which are described above, may be performed on this LCD.

Further, in the above description, the touch panel 13 is integrally provided in the game apparatus 10. However, it is understood that the present invention can be achieved even when the game apparatus and the touch panel are provided independently.

Further, in the above description, the touch panel 13 is used as an input means of the game apparatus 10 for implementing an coordinate input. However, another pointing device may be used. Here, the pointing device is an input device for designating an input position or a coordinate on a screen, and, for example, a mouse, a trackpad, a trackball, or the like is used as the input device. When position information in a screen coordinate system which is calculated from an output value outputted from the input device is used, the present invention can be achieved similarly.

Further, in the case of a stationary game apparatus whose game controller is held by a user while a game is played, a pointing device in another form is also considered. For example, a camera fixed to a housing of the game controller can be used as the pointing device. In this case, in accordance with a change in a position at which the housing of the game controller is pointed, an image taken by the camera is changed. Thus, by analyzing the taken image, a coordinate of the position at which the housing is pointed with respect to a display screen can be calculated. It is understood that the present invention can be achieved even when the pointing device such as the touch panel 13 is not provided in the game apparatus 10.

Further, the above embodiments have been described by using the hand-held game apparatus 10 and the stationary game apparatus. However, the present invention may be achieved by executing the information processing program of the present invention in an information processing apparatus such as a general personal computer.

Further, the shape of the aforementioned game apparatus 10 and the shapes, numbers, and installed positions of the operation button 14 and the touch panel 13 provided therein are merely one example, and it is understood that the present invention can be achieved with other shapes, numbers and installed positions. In addition, the execution order of each step, the screen image, or the like, which are used in the aforementioned information processing, are merely one example, and it is understood that the present invention can be achieved with other execution order and screen image.

Further, in the above description, the game program is executed in the information processing section 31 as an example of the information processing program. However, at least a part of the information processing program according to the present embodiment may be executed in an information processing section which includes a CPU and is provided in another apparatus which is communicable with the information processing section 31. When the game program is executed as an example of the information processing program according to the present embodiment, for example, in the case where the game apparatus 10 is configured to be communicable with another apparatus (e.g., a server), the processing in the game program may be performed by using the game apparatus 10 and the other apparatus in a cooperative manner. For example, the game program may be executed in a game system which is configured such that: the game program is executed in another apparatus; and the touch panel 13 and the upper LCD 22 and/or the lower LCD 12 of the game apparatus 10 are used for: detection of an operation input needed for executing the game program; a display device for performing display needed for executing the game program; and the like. The same applies to the motion setting program described above as another example of the information processing program according to the present embodiment. In other words, as an example, the information processing program according to the present embodiment may be executed in an information processing system which is configured such that: the information processing program is executed in another apparatus; and the touch panel 13 and the upper LCD 22 and/or the lower LCD 12 of the game apparatus 10 are used for: detection of an operation input needed for executing the information processing program; a display device for performing display needed for executing the information processing program; and the like.

Further, the above information processing program may be supplied to the game apparatus 10 not only from an external storage medium such as the external memory 45 and the external data storage memory 46, but also via a wireless or wired communication line. Further, the above program may be previously stored in a non-volatile storage unit of the game apparatus 10. Examples of an information storage medium having stored the above program therein include, a CD-ROM, a DVD, any other optical disc-shaped storage medium similar to these media, a flexible disk, a hard disk, a magnetic optical disk, and a magnetic tape, in addition to a non-volatile memory. Further, the information storage medium storing the above program therein may be a volatile memory storing the above program therein.

While the invention has been described in detail, the foregoing description is in all aspects illustrative and not restrictive. It is to be understood that numerous other modifications and variations can be devised without departing from the scope of the invention. It is also to be understood that the scope of the invention is indicated by the appended claims rather than by the foregoing description. It is also to be understood that the detailed description herein enables one skilled in the art to make changes coming within the meaning and equivalency range of the present invention. It should be also understood that the terms as used herein have definitions typically used in the art unless otherwise mentioned. Thus, unless otherwise defined, all scientific and technical terms have the same meanings as those generally used by those skilled in the art to which the present invention pertain. If there is contradiction, the present specification (including the definitions) precedes.

The storage medium having stored the information processing program therein, the information processing apparatus, the information processing method, and the information processing system, according to the present invention, are useful for a storage medium having stored an information processing program therein, an information processing apparatus, an information processing method, an information processing system, and the like, which control a motion of an object in accordance with an identified user.

What is claimed is:

1. A non-transitory computer-readable storage medium having stored therein an information processing program which, when executed by a computer of an information processing apparatus which includes an imaging device and renders one or more objects appearing in a virtual space, causes the computer to perform operations comprising:

storing, using a face characteristic data storage, face characteristic data indicating a characteristic of a face included in a first taken image obtained by previous capturing;

storing, as a number of selection times, a number of times which the stored face characteristic data is selected, such that the number of times corresponds to each piece of the face characteristic data; and adapting a rendering process, which is initialized to make each of the objects move according to a predetermined motion pattern that is previously stored in a memory, to an identified characteristic of a face included in a second taken image obtained from the imaging device, wherein the adapting includes:

detecting the characteristic of the face included in the second taken image;

when the characteristic of the face is detected in the second image, selecting a piece of the face characteristic data which corresponds to the detected characteristic of the face, from the stored face characteristic data and updating the stored number of selection times which corresponds to the selected piece of the face characteristic data; and controlling, on the basis of the selected piece of the face characteristic data and the number of selection times corresponding to the selected piece of the face characteristic data, a motion of each object in the initialized rendering process so as to be a motion performed in accordance with the selected piece of the face characteristic data instead of the motion performed in accordance with the predetermined motion pattern when not adapting the initialized rendering process to the identified characteristic.

2. The computer-readable storage medium according to claim 1, wherein the operations further comprise:

causing the object to perform a predetermined first motion when the number of selection times corresponding to the selected piece of the face characteristic data is equal to or more than a predetermined first threshold; and causing the object to perform a predetermined second motion different from the first motion, when the number of selection times corresponding to the selected piece of the face characteristic data is less than the first threshold.

3. The computer-readable storage medium according to claim 2, wherein the operations further comprise:

causing the object to perform the second motion when the number of selection times corresponding to the selected piece of the face characteristic data is equal to or more than a predetermined second threshold which is lower than the first threshold; and causing the object to perform a predetermined third motion different from the first motion and the second motion, when the number of selection times corresponding to the selected piece of the face characteristic data is less than the second threshold.

4. The computer-readable storage medium according to claim 3, wherein the information processing program causes the computer to perform operations further comprising:

determining whether or not the piece of the face characteristic data which corresponds to the detected characteristic of the face is stored in the face characteristic data storage, and when a result of the determining is negative, causing the object to perform the second motion.

5. The computer-readable storage medium according to claim 3, wherein the operations further comprise causing the object to perform the second motion, when the characteristic of the face is not detected by the detecting.

6. The computer-readable storage medium according to claim 4, wherein the information processing program causes the computer to perform operations further comprising:

storing identification information which identifies the selected piece of the face characteristic data, and controlling the motion of the object on the basis of the piece of the face characteristic data which is identified by the stored identification information.

7. The computer-readable storage medium according to claim 1, wherein the information processing program causes the computer to perform operations further comprising:

detecting at least one of a relative position and a relative orientation of the face, which is included in the taken image obtained from the imaging device, relative to the imaging device, and causing the object to perform a motion on the basis of the face characteristic data and the detected at least one of the relative position and the relative orientation.

8. The computer-readable storage medium according to claim 7, wherein the information processing program causes the computer to perform operations further comprising:

storing the detected at least one of the relative position and the relative orientation, and controlling the motion of the object on the basis of the face characteristic data and the stored at least one of the relative position and the relative orientation.

9. The computer-readable storage medium according to claim 1, wherein the information processing program causes the computer to perform operations further comprising:

calculating an elapsed time from a time when the number of selection times is last updated, and when a piece of the face characteristic data is selected when the elapsed time is equal to or more than a predetermined time, updating the number of selection times corresponding to the selected piece of the face characteristic data.

10. The computer-readable storage medium according to claim 1, wherein the storing the number of times comprises;

storing the number of selection times corresponding to the face characteristic data such that the number of selection times corresponds to each object, wherein the updating the stored number of selection times comprises updating, for each object, the number of selection times corresponding to the selected piece of the face characteristic data, and wherein the performing motion control comprises controlling the motion of each object on the basis of the number of selection times corresponding to the selected piece of the face characteristic data.

11. The computer-readable storage medium according to claim 10, wherein the updating the stored number of selection times further comprise updating the number of selection times corresponding to each object rendered so as to appear in the virtual space, among the numbers of selection times corresponding to the selected piece of the face characteristic data.

12. The computer-readable storage medium according to claim 1, wherein the storing the number of times further comprises storing date and time when the number of selection times is updated, as last update date and time, such that the date and time corresponds to each piece of the face characteristic data, and when a piece of the face characteristic data is selected when an elapsed time from the last update date and time is equal to or more than a predetermined time, updating the number of selection times corresponding to the selected piece of the face characteristic data.

13. The computer-readable storage medium according to claim 1, wherein the information processing program causes the computer to perform operations further comprising:

determining whether or not the piece of the face characteristic data which corresponds to the detected characteristic of the face is stored in the face characteristic data storage; and when a determination result of the determining is negative, newly storing, in the face characteristic data storage, the piece of the face characteristic data which corresponds to the detected characteristic of the face.

14. The computer-readable storage medium according to claim 13, wherein the information processing program causes the computer to perform operations further comprising:
deleting any one piece of the face characteristic data if the number of pieces of the face characteristic data stored in the face characteristic data storage is a predetermined registerable number when a new piece of the face characteristic data is stored, and
storing the new piece of the face characteristic data after the deleting.

15. The computer-readable storage medium according to claim 1, wherein the information processing program causes the computer to perform operations further comprising:
updating the detected characteristic of the face with a characteristic of a face which is indicated by the selected piece of the face characteristic data.

16. The computer-readable storage medium according to claim 15, wherein the information processing program causes the computer to perform operations further comprising:
calculating a similarity degree between the detected characteristic of the face and the characteristic of the face which is indicated by the selected piece of the face characteristic data, and
when the similarity degree is equal to or more than a predetermined similarity degree threshold, updating the characteristic of the face which is indicated by the selected piece of the face characteristic data.

17. The computer-readable storage medium according to claim 1, wherein the information processing program is executed by the computer of the information processing apparatus which is held by a user and in which the imaging device is located at a position where the imaging device is capable of taking an image of a face of the user from a front of the user when the user looks straight at a display screen on which each object is rendered.

18. An information processing apparatus which includes an imaging device and renders one or more objects appearing in a virtual space, the information processing apparatus comprising:
storage; and
at least one processor communicatively coupled to the storage and configured to:
store face characteristic data indicating a characteristic of a face included in a first taken image obtained by previous capturing;
store, as a number of selection times, a number of times which the stored face characteristic data is selected, such that the number of times corresponds to each piece of the face characteristic data; and
adapt a rendering process, which is initialized to make each of the objects move according to a predetermined motion pattern previously stored in a memory, to an identified characteristic of a face included in a second taken image obtained from the imaging device, wherein the adapting includes:
detecting the characteristic of the face included in the second taken image;
when the characteristic of the face is detected in the second image, selecting a piece of the face characteristic data which corresponds to the detected characteristic of the face from the stored face characteristic data and updating the stored number of selection times which corresponds to the selected piece of the face characteristic data; and
controlling, on the basis of the selected piece of the face characteristic data and the number of selection times corresponding to the selected piece of the face characteristic data, a motion of each object in the rendering process so as to be a motion performed in accordance with the selected piece of the face characteristic data instead of the motion performed in accordance with the predetermined motion pattern when not adapting the initialized rendering process to the identified characteristic.

19. An information processing method which is performed in an information processing apparatus which includes an imaging device and renders one or more objects appearing in a virtual space, the information processing method comprising:
storing face characteristic data indicating a characteristic of a face included in a first taken image obtained by previous capturing;
storing, as a number of selection times, a number of times which the stored face characteristic data is selected, such that the number of times corresponds to each piece of the face characteristic data; and
adapting a rendering process, which is initialized to make each of the objects move according to a predetermined motion pattern that is previously stored in a memory, to an identified characteristic of a face included in a second taken image obtained from the imaging device, wherein the adapting includes:
detecting the characteristic of the face included in the second taken image;
when the characteristic of the face is detected in the second image, selecting a piece of the face characteristic data corresponding to the detected characteristic of the face from among the stored face characteristic data and updating the stored number of selection times which corresponds to the selected piece of the face characteristic data; and
controlling, on the basis of the selected piece of the face characteristic data and the number of selection times corresponding to the selected piece of the face characteristic data, a motion of each object in the initialized rendering process so as to be a motion performed in accordance with the selected piece of the face characteristic data instead of the motion performed in accordance with the predetermined motion pattern when not adapting the initialized rendering process to the identified characteristic.

20. An information processing system which includes an imaging device and renders one or more objects appearing in a virtual space, the information processing system comprising:
face characteristic data storage configured to store face characteristic data indicating a characteristic of a face included in a first taken image obtained by previous capturing; and
one or more processors communicatively coupled to the face characteristic data storage and configured to perform operations comprising:
storing, as a number of selection times, a number of times which the stored face characteristic data is selected, such that the number of times corresponds to each piece of the face characteristic data;
adapting a rendering process, which is initialized to make each of the objects move according to a predetermined motion pattern that is previously stored in a memory, to an identified characteristic of a face included in a second taken image obtained from the imaging device, wherein the adapting includes:

detecting the characteristic of the face included in the second taken image;

when the characteristic of the face is detected in the second image, selecting a piece of the face characteristic data corresponding to the characteristic of the detected face from the face characteristic data storage and updating the stored number of selection times which corresponds to the selected piece of the face characteristic data; and controlling, on the basis of the piece of the face characteristic data selected by the face characteristic data selector and the number of selection times corresponding to the selected piece of the face characteristic data, a motion of each object in the initialized rendering process so as to be a motion performed in accordance with the selected piece of the face characteristic data instead of the motion performed in accordance with the predetermined motion pattern when not adapting the initialized rendering process to the identified characteristic.

21. An apparatus comprising:

an image capture device for capturing images;

a storage device storing face characteristic data indicating a characteristic of a human face included in a first image obtained by previous capturing;

a graphics generator for rendering an artificial graphical object in a virtual space for display; and at least one processor coupled to the image capture device and to the graphics generator, the at least one processor being configured to:

store, as a number of selection times, a number of times which the stored face characteristic data is selected, such that the number of times corresponds to each piece of the face characteristic data;

initialize a rendering process to move the rendered artificial object according to a predetermined motion pattern that is previously stored in a memory;

analyze second images captured by the image capture device to detect human faces;

in response to detection of a human face in captured second images, extracting position and/or orientation of one or more aspects of said detected human face corresponding to the face characteristic data stored in the storage device and update the stored number of selection times which corresponds to the extracted position and/or orientation of one or more aspects of said detected human face; and adapting the initialized rendering process to impart motion to the rendered artificial graphical object at least in part in response to the extracted position and/or orientation of aspects of the detected human face and the number of selection times corresponding to the selected piece of the face characteristic data in order to move the rendered artificial graphical object according to the extracted position and/or orientation of aspects of the detected human face instead of according to the predetermined motion pattern.

22. The non-transitory computer-readable storage medium according to claim 1, wherein the information processing program causes the computer to perform operations further comprising:

storing, respectively in association with each object of a plurality of said objects, information regarding said pieces of face characteristic data; and wherein the controlling includes:

for a first object of the plurality of said objects, determining a motion in accordance with the stored information regarding pieces of face characteristic data associated with the first object; and controlling the first object in accordance with the determined motion.

23. The non-transitory computer-readable storage medium according to claim 22, wherein the first object, among the plurality of objects, is specified for each user of the information processing apparatus, the user corresponding to the stored face characteristic data.

24. The computer-readable storage medium according to claim 1, wherein the initialized rendering process continuously moves the objects according to the predetermined motion pattern.

25. The computer-readable storage medium according to claim 1, wherein moving one of the objects according to the predetermined motion pattern includes moving the object in the virtual space according to a characteristic motion pattern of a biological object.

26. The computer-readable storage medium according to claim 1, wherein moving one of the objects according to the predetermined motion pattern includes moving the object in the virtual space according to a characteristic motion pattern of a biological object without being responsive to a detection of a user, and wherein moving the object according to the selected piece of face characteristic data includes moving the object in the virtual space according to another characteristic motion pattern of the biological object.

* * * * *